United States Patent
Sahara et al.

(10) Patent No.: US 7,571,264 B2
(45) Date of Patent: Aug. 4, 2009

(54) COMPUTER SYSTEM FOR LOAD BALANCE, AND METHOD AND PROGRAM FOR SETTING PATH

(75) Inventors: Hirofumi Sahara, Yokohama (JP); Hiroshi Morishima, Yokohama (JP); Makoto Aoki, Kawasaki (JP); Osamu Kohama, Yokohama (JP); Satoshi Kadoiri, Chigasaki (JP); Isao Nagase, Ebina (JP)

(73) Assignees: Hitachi, Ltd., Tokyo (JP); Hitachi Software Engineering Co., Ltd., Kanagawa (JP)

( * ) Notice: Subject to any disclaimer, the term of this patent is extended or adjusted under 35 U.S.C. 154(b) by 387 days.

(21) Appl. No.: 11/188,887

(22) Filed: Jul. 26, 2005

(65) Prior Publication Data
US 2006/0230189 A1    Oct. 12, 2006

(30) Foreign Application Priority Data
Apr. 6, 2005    (JP)    ............... 2005-109527

(51) Int. Cl.
G06F 13/00    (2006.01)
G06F 3/00    (2006.01)
G01R 31/28    (2006.01)
G06F 15/173    (2006.01)
G06F 15/16    (2006.01)

(52) U.S. Cl. ............... 710/31; 710/38; 710/316; 714/4; 709/239; 709/241

(58) Field of Classification Search ............... 714/4; 710/316, 38, 31; 709/239, 241
See application file for complete search history.

(56) References Cited

U.S. PATENT DOCUMENTS

| | | | | |
|---|---|---|---|---|
| 4,633,387 A * | 12/1986 | Hartung et al. | ............... | 718/105 |
| 4,638,424 A * | 1/1987 | Beglin et al. | ............... | 711/117 |
| 5,239,649 A * | 8/1993 | McBride et al. | ............... | 718/105 |
| 6,601,084 B1 * | 7/2003 | Bhaskaran et al. | ............... | 718/105 |
| 6,766,359 B1 * | 7/2004 | Oliveira et al. | ............... | 709/213 |
| 6,802,021 B1 * | 10/2004 | Cheng et al. | ............... | 714/4 |
| 7,058,758 B2 * | 6/2006 | Allen et al. | ............... | 711/111 |
| 2002/0156887 A1 * | 10/2002 | Hashimoto | ............... | 709/224 |
| 2004/0078632 A1 * | 4/2004 | Infante et al. | ............... | 714/5 |
| 2005/0182849 A1 * | 8/2005 | Chandrayana et al. | ............... | 709/235 |

FOREIGN PATENT DOCUMENTS

| | | |
|---|---|---|
| JP | 2000-330924 | 11/2000 |
| JP | 2002-182978 | 6/2002 |

* cited by examiner

Primary Examiner—Alford W Kindred
Assistant Examiner—Farley J Abad
(74) Attorney, Agent, or Firm—Brundidge & Stanger, P.C.

(57) ABSTRACT

Provided is a computer system which includes computers and a storage system coupled to the computers. The storage system includes a first load measuring module that measures a first access load for each channel adaptor. At least one of the computers includes a path management module that manages paths through which the computers access logical units. The path management module includes a second load measuring module that measures a second access load imposed by access from the computer to the logical unit, and an active path setting module that selects one of the channel adaptors based on the first access and the second access load measured by the first and second load measuring modules, and setting an active path passing through the channel adaptor. Thus, a load on an entire system is balanced, thereby improving performance while a cache hit rate of a storage system is maintained.

6 Claims, 33 Drawing Sheets

PATH TABLE (HOST A)

| PATH NO. | FAILURE STATUS | ACTIVE INFORMATION | HBA-ID | CHA-ID | LU-ID | MEASURED LOAD | NUMBER OF ACTIVE-PATH-SET LU'S |
|---|---|---|---|---|---|---|---|
| 1 | No | Yes | 1 | 1 | 1 | 1500 | 1 |
| 2 | No | No | 1 | 2 | 1 | 0 | 0 |
| 3 | No | No | 1 | 3 | 1 | 0 | 0 |
| 4 | No | No | 2 | 1 | 1 | 0 | 0 |
| 5 | No | No | 2 | 2 | 1 | 0 | 0 |
| 6 | No | No | 2 | 3 | 1 | 0 | 0 |
| 7 | No | No | 1 | 1 | 2 | 0 | 0 |
| 8 | No | No | 1 | 2 | 2 | 0 | 0 |
| 9 | No | No | 1 | 3 | 2 | 0 | 0 |
| 10 | No | No | 2 | 1 | 2 | 0 | 0 |
| 11 | No | Yes | 2 | 2 | 2 | 1200 | 1 |
| 12 | No | No | 2 | 3 | 2 | 0 | 0 |
| 13 | No | No | 1 | 1 | 3 | 0 | 0 |
| 14 | No | No | 1 | 2 | 3 | 0 | 0 |
| 15 | No | Yes | 1 | 3 | 3 | 800 | 1 |
| 16 | No | No | 2 | 1 | 3 | 0 | 0 |
| 17 | No | No | 2 | 2 | 3 | 0 | 0 |
| 18 | No | No | 2 | 3 | 3 | 0 | 0 |
| 19 | No | No | 1 | 1 | 4 | 0 | 0 |
| 20 | No | No | 1 | 2 | 4 | 0 | 0 |
| 21 | No | No | 1 | 3 | 4 | 0 | 0 |
| 22 | No | Yes | 2 | 1 | 4 | 500 | 1 |
| 23 | No | No | 2 | 2 | 4 | 0 | 0 |
| 24 | No | No | 2 | 3 | 4 | 0 | 0 |

*FIG.4*

LU TABLE (HOST A)

| LU-ID (501) | MEASURED LOAD (502) | PATH ID OF CURRENT ACTIVE PATH (503) | PATH ID OF NEW ACTIVE PATH (504) |
|---|---|---|---|
| 1 | 1500 | 111 | -1 |
| 2 | 1200 | 222 | -1 |
| 3 | 800 | 133 | -1 |
| 4 | 500 | 214 | -1 |

*FIG.5*

HBA TABLE (HOST A)

| HBA-ID | MEASURED LOAD (TOTAL OF ALL PATHS) | ALLOCATED LOAD | NUMBER OF ACTIVE-PATH-SET LU'S |
|---|---|---|---|
| 1 | 2300 | 0 | 2 |
| 2 | 1700 | 0 | 2 |

*FIG.6*

CHA TABLE (HOST A)

| CHA-ID | MEASURED LOAD (TOTAL OF ALL PATHS) | ALLOCATED LOAD | NUMBER OF OWN HOST ACTIVE-PATH-SET LU'S |
|---|---|---|---|
| 1 | 2000 | 0 | 2 |
| 2 | 1200 | 0 | 1 |
| 3 | 800 | 0 | 1 |

FIG.7

LOAD INFORMATION TABLE (HOST A)

| CHA-ID | STORAGE MEASURED LOAD | OWN HOST MEASURED LOAD | ANOTHER HOST LOAD |
|---|---|---|---|
| 1 | 2400 | 2000 | 400 |
| 2 | 2200 | 1200 | 1000 |
| 3 | 3000 | 800 | 2200 |

*FIG.8*

LOAD INFORMATION TABLE (HOST B)

| CHA-ID | STORAGE MEASURED LOAD | OWN HOST MEASURED LOAD | ANOTHER HOST LOAD |
|--------|----------------------|------------------------|-------------------|
| 1 | 2000 | 0 | 2000 |
| 2 | 1200 | 0 | 1200 |
| 3 | 800 | 0 | 800 |

*FIG.21*

PATH TABLE (HOST B)

| PATH NO. | FAILURE STATUS | ACTIVE INFORMATION | HBA-ID | CHA-ID | LU-ID | MEASURED LOAD | NUMBER OF ACTIVE-PATH-SET LU'S |
|---|---|---|---|---|---|---|---|
| 1 | No | No | 3 | 1 | 1 | 0 | 0 |
| 2 | No | No | 3 | 2 | 1 | 0 | 0 |
| 3 | No | Yes | 3 | 3 | 1 | 0 | 1 |
| 4 | No | No | 4 | 1 | 1 | 0 | 0 |
| 5 | No | No | 4 | 2 | 1 | 0 | 0 |
| 6 | No | No | 4 | 3 | 1 | 0 | 0 |
| 7 | No | No | 3 | 1 | 2 | 0 | 0 |
| 8 | No | No | 3 | 2 | 2 | 0 | 0 |
| 9 | No | No | 3 | 3 | 2 | 0 | 0 |
| 10 | No | No | 4 | 1 | 2 | 0 | 0 |
| 11 | No | Yes | 4 | 2 | 2 | 0 | 1 |
| 12 | No | No | 4 | 3 | 2 | 0 | 0 |
| 13 | No | No | 2 | 1 | 3 | 0 | 0 |
| 14 | No | No | 3 | 2 | 3 | 0 | 0 |
| 15 | No | Yes | 3 | 3 | 3 | 0 | 1 |
| 16 | No | No | 4 | 1 | 3 | 0 | 0 |
| 17 | No | No | 4 | 2 | 3 | 0 | 0 |
| 18 | No | No | 4 | 3 | 3 | 0 | 0 |
| 19 | No | No | 3 | 1 | 4 | 0 | 0 |
| 20 | No | No | 3 | 2 | 4 | 0 | 0 |
| 21 | No | No | 3 | 3 | 4 | 0 | 0 |
| 22 | No | Yes | 4 | 1 | 4 | 0 | 1 |
| 23 | No | No | 4 | 2 | 4 | 0 | 0 |
| 24 | No | No | 4 | 3 | 4 | 0 | 0 |

FIG.22

LU TABLE (HOST B)

| LU-ID | MEASURED LOAD | PATH ID OF CURRENT ACTIVE PATH | PATH ID OF NEW ACTIVE PATH |
|---|---|---|---|
| 1 | 0 | 331 | 331 |
| 2 | 0 | 422 | 422 |
| 3 | 0 | 333 | 333 |
| 4 | 0 | 414 | 414 |

*FIG.23*

HBA TABLE (HOST B)

| HBA-ID | MEASURED LOAD (TOTAL OF ALL PATHS) | ALLOCATED LOAD | NUMBER OF ACTIVE-PATH-SET LU'S |
|---|---|---|---|
| 3 | 0 | 0 | 2 |
| 4 | 0 | 0 | 2 |

*FIG.24*

CHA TABLE (HOST B)

| CHA-ID | MEASURED LOAD (TOTAL OF ALL PATHS) | ALLOCATED LOAD | NUMBER OF OWN HOST ACTIVE-PATH-SET LU'S |
|---|---|---|---|
| 1 | 0 | 3000 | 1 |
| 2 | 0 | 2200 | 1 |
| 3 | 0 | 2800 | 2 |

*FIG.25*

|  | PATH ID OF SET INITIAL ACTIVE PATH 2601 | | | |
|---|---|---|---|---|
|  | LU1 | LU2 | LU3 | LU4 |
| 2602 — STORAGE MEASURED LOAD IS NOT REFERRED TO | 311 | 422 | 333 | 414 |
| 2603 — STORAGE MEASURED LOAD IS REFERRED TO (THIS EMBODIMENT) | 331 | 422 | 333 | 414 |

*FIG.26*

HBA TABLE (HOST A)

| HBA-ID | MEASURED LOAD (TOTAL OF ALL PATHS) | ALLOCATED LOAD | NUMBER OF ACTIVE-PATH-SET LU'S |
|---|---|---|---|
| 1 | 0 | 2000 | 2 |
| 2 | 0 | 2000 | 2 |

FIG.28

CHA TABLE (HOST A)

| CHA-ID | MEASURED LOAD (TOTAL OF ALL PATHS) | ALLOCATED LOAD | NUMBER OF OWN HOST ACTIVE-PATH-SET LU'S |
|---|---|---|---|
| 1 | 0 | 2700 | 2 |
| 2 | 0 | 2200 | 1 |
| 3 | 0 | 2700 | 1 |

*FIG.29*

|  | PATH ID OF RESET ACTIVE PATH 3101 | | | |
| --- | --- | --- | --- | --- |
|  | LU1 | LU2 | LU3 | LU4 |
| 3102 — ANOTHER HOST LOAD IS NOT REFERRED TO | 111 | 222 | 233 | 134 |
| 3103 — ANOTHER HOST LOAD IS REFERRED TO (THIS EMBODIMENT) | 111 | 222 | 213 | 134 |

*FIG.31*

HBA TABLE (HOST A)

| HBA-ID | MEASURED LOAD (TOTAL OF ALL PATHS) | ALLOCATED LOAD | NUMBER OF ACTIVE-PATH-SET LU'S |
|---|---|---|---|
| 1 | 2300 | 1500 | 1 |
| 2 | 1700 | 1700 | 2 |

*FIG.32*

CHA TABLE (HOST A)

| CHA-ID | MEASURED LOAD (TOTAL OF ALL PATHS) | ALLOCATED LOAD | NUMBER OF OWN HOST ACTIVE-PATH-SET LU'S |
|---|---|---|---|
| 1 | 2000 | 2400 | 2 |
| 2 | 1200 | 2200 | 1 |
| 3 | 800 | 2200 | 0 |

FIG.33

COMPUTER SYSTEM FOR LOAD BALANCE, AND METHOD AND PROGRAM FOR SETTING PATH

CROSS-REFERENCE TO PRIOR APPLICATION

This application relates to and claims priority from Japanese Patent Application No. 2005-109527, filed on Apr. 6, 2005 the entire disclosure of which is incorporated herein by reference.

BACKGROUND OF THE INVENTION

This invention relates to access load balance of a computer system.

There has been known a technology of improving system performance by setting a plurality of accessible paths between a storage system and a computer and balancing access from the computer to these paths. According to such a load balancing technology, a load of access (I/O) is balanced among the plurality of paths, and thus it is possible to prevent reduction in performance caused by access centralized in a particular path. Moreover, when a failure occurs in one path, access is allocated to another normal path, thereby allowing the access to continue.

There has also been known a technology of improving system performance by using a cache memory installed in a storage system. For example, a cache look-ahead technology has been known which improves access performance by reading data of a block involved in a reading request and data of the next block and storing the data in the cache memory.

The conventional technologies described above are disclosed in, for example, JP 2000-330924 A and JP 2002-182978 A.

SUMMARY OF THE INVENTION

The conventional load balancing technology gives no consideration to use of a function, such as a data look-ahead function, of using a cache memory of the storage system. Thus, access to the same logical unit (LU) is balanced across the plurality of paths unable to use the same cache memory, causing reduction in cache hit rate. As a result, it is impossible to make the most of the data look-ahead function or the like. When a plurality of computers are connected to the storage system, when each computer intends to balance a load with disregard to access by the other computers, the load may not be balanced in the entire system. Thus, the system performance cannot be sufficiently improved by the conventional load balancing technology.

This invention has been made in view of the above, and it is therefore an object of this invention to provide a computer system for load balance.

According to an embodiment of this invention, there is provided a computer system including: a plurality of computers; and a storage system coupled to the plurality of computers, wherein: the storage system includes a plurality of channel adaptors that couple with the plurality of computers, a plurality of logical units that store data, and a first load measuring module that measures a first access load for each channel adaptor; each of the computers includes one or more host bus adaptors that couple with the storage system; at least one of the computers includes a path management module that manages paths through which the computers access the logical units; and the path management module includes: a second load measuring module that measures, for each logical unit, a second access load imposed by access from the computer to the logical unit; and an active path setting module that selects one of the channel adaptors for each logical unit based on the first access load measured by the first load measuring module and the second access load measured by the second load measuring module, and sets an active path passing through the channel adaptor.

According to this invention, since the access load is balanced, it is possible to prevent reduction in system performance caused by the centralized load. In the case of access to the same logical unit, the same cache memory can be used. Thus, the system performance is improved by data look-ahead or the like. Furthermore, when a plurality of computers are connected to the storage system, it is possible to improve the system performance by balancing the load on the entire system.

BRIEF DESCRIPTION OF THE DRAWINGS

FIG. 4 is an explanatory diagram of a path table according to the embodiment of this invention.

FIG. 5 is an explanatory diagram of an LU table according to the embodiment of this invention.

FIG. 6 is an explanatory diagram of an HBA table according to the embodiment of this invention.

FIG. 7 is an explanatory diagram of a CHA table according to the embodiment of this invention.

FIG. 8 is an explanatory diagram of a load information table according to the embodiment of this invention.

FIG. 21 is an explanatory diagram of a load information table of a host B at a point of time of starting the host B according to the embodiment of this invention.

FIG. 22 is an explanatory diagram of a path table of the host B according to the embodiment of this invention.

FIG. 23 is an explanatory diagram of an LU table of the host B according to the embodiment of this invention.

FIG. 24 is an explanatory diagram of an HBA table of the host B according to the embodiment of this invention.

FIG. 25 is an explanatory diagram of a CHA table of the host B according to the embodiment of this invention.

FIG. 26 is an explanatory diagram of an effect of an initial active path setting processing according to the embodiment of this invention.

FIG. 28 is an explanatory diagram of an HBA table of the host A in which an active path is reset according to the embodiment of this invention.

FIG. 29 is an explanatory diagram of a CHA table of the host A in which the active path is reset according to the embodiment of this invention.

FIG. 31 is an explanatory diagram of an effect of active path resetting processing according to the embodiment of this invention.

FIG. 32 is an explanatory diagram of an HBA table in the active path resetting processing at an active path stop time according to the embodiment of this invention.

FIG. 33 is an explanatory diagram of a CHA table in the active path resetting processing at the active path stop time according to the embodiment of this invention.

DETAILED DESCRIPTION OF THE PREFERRED EMBODIMENT

Hereinafter, an embodiment of this invention will be described with reference to the accompanying drawings.

According to the embodiment, in a computer system where a storage system and a plurality of hosts are interconnected, not only each host but also the storage system measure an access load a predetermined time, and an access path is set so that the measured access load can be balanced as uniformly as possible to devices.

Figure 1:
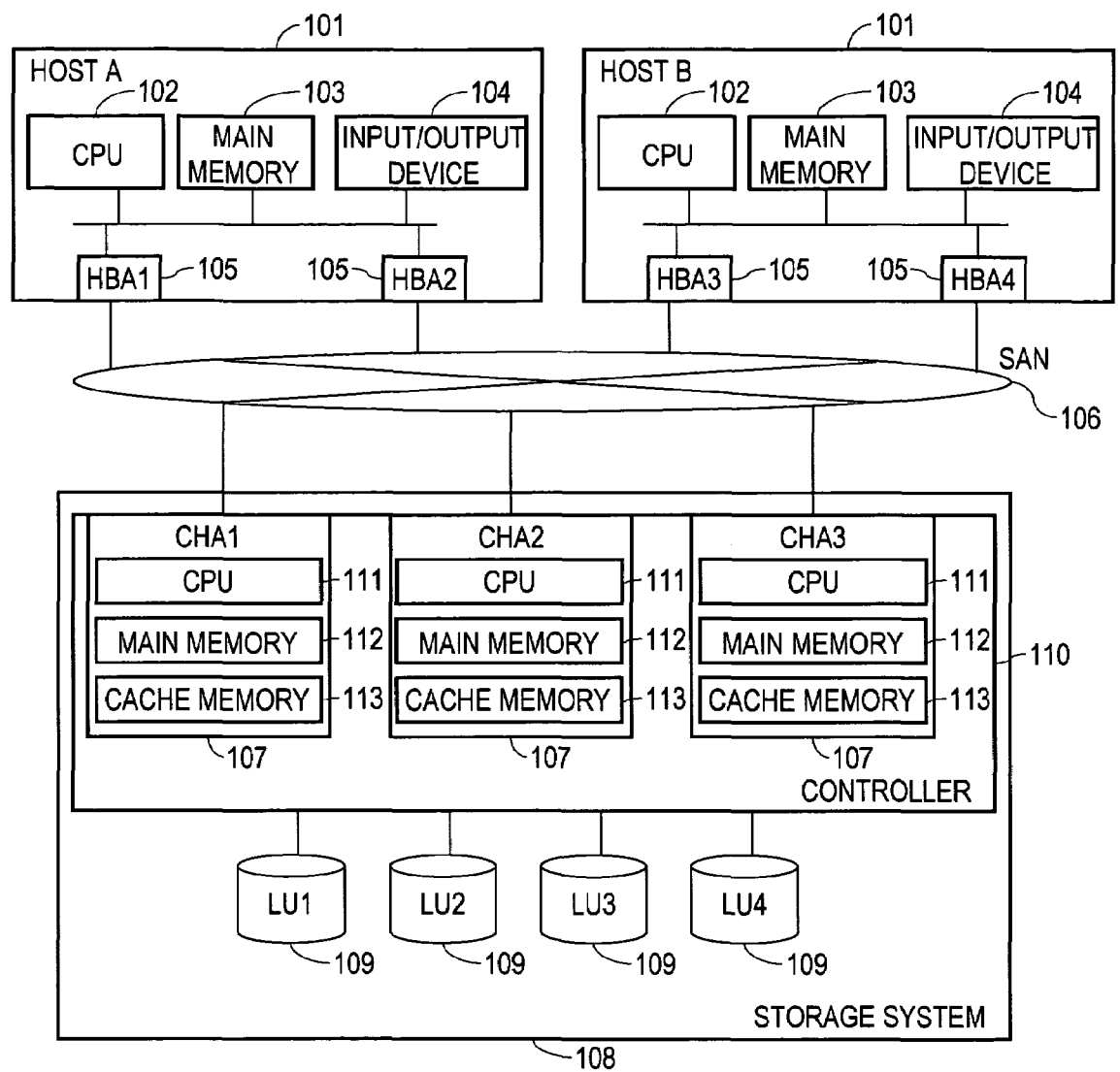
FIG. 1 is a block diagram showing a configuration of a computer system according to an embodiment of this invention.

FIG. 1 is a block diagram showing a configuration of the computer system according to the embodiment of this invention.

The computer system of the embodiment of this invention includes at least one host 101, a storage system 108, and a storage area network (SAN) 106 for interconnecting these components to enable communication therebetween.

The host 101 is a computer which writes data in the storage system 108, and reads the data therefrom. The host 101 includes at least a CPU 102, a main memory 103, an input/output device 104, and a host bus adaptor (HBA) 105.

As shown in FIG. 1, the computer system of the embodiment of this invention includes two hosts 101. However, this invention can be applied to a computer system which includes many more hosts 101.

Referring to FIG. 1, a host A and a host B are respectively hosts 101 of host names "A" and "B".

The CPU 102 is a processor for executing a program stored in the main memory 103.

Figure 2:
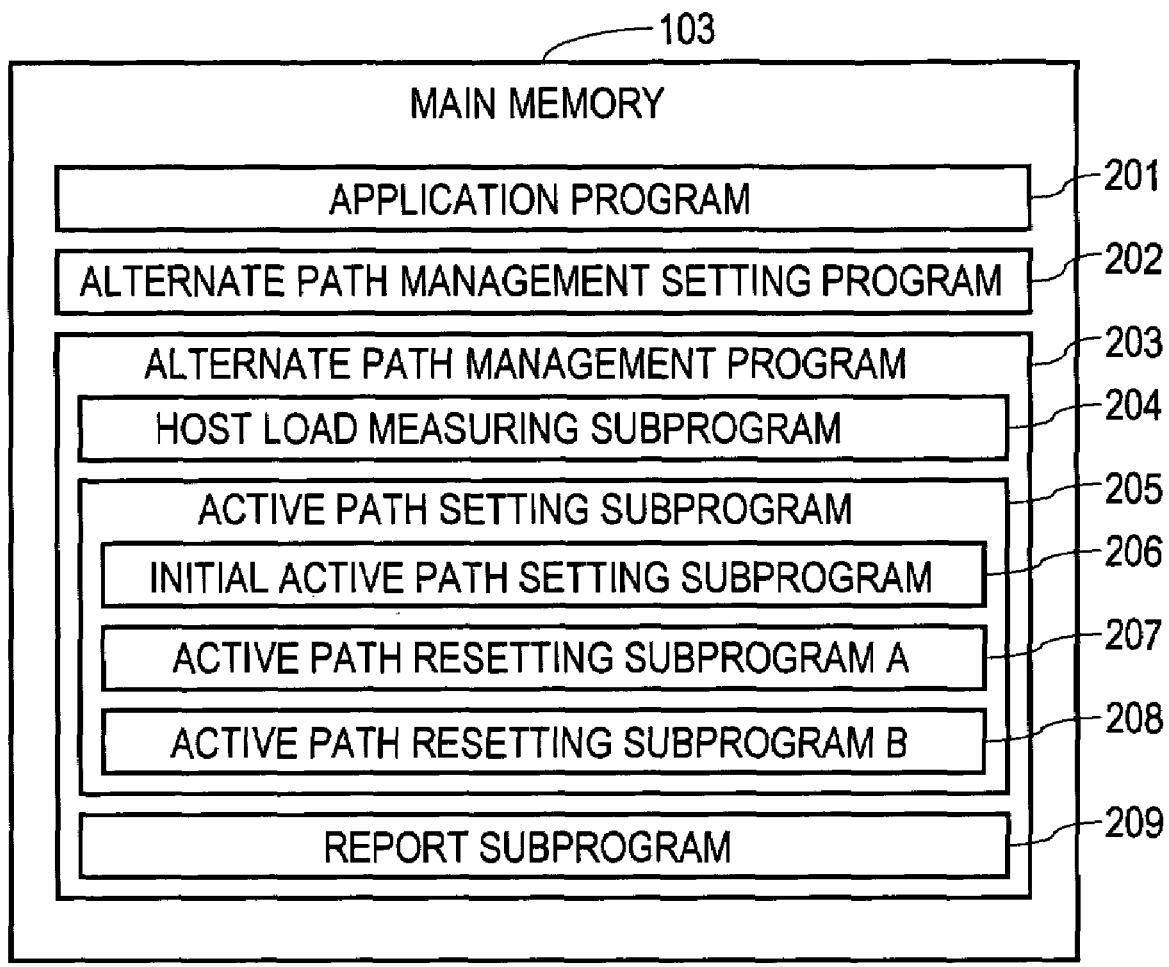
FIG. 2 is an explanatory diagram of a program stored in a main memory of a host according to the embodiment of this invention.

For example, the main memory 103 is a semiconductor memory in which programs executed by the CPU 102 are as stored shown in FIG. 2. Additionally, tables shown in FIGS. 4 to 8 are stored in the main memory 103.

For example, the input/output device 104 is a display screen or a keyboard (not shown), and may include other input/output means such as a mouse or a printer.

One or more HBA's 105 are disposed in the host 101, and communicate with the storage system 108 via the SAN 106. In the example of FIG. 1, each host 101 includes two HBA's 105. Each HBA 105 is identified by an HBA identifier (HBA-ID). HBA's 1 to 4 of FIG. 1 are HBA's 105 whose HBA-ID's are respectively "1", "2", "3", and "4". The host A includes the HBA's 1 and 2, and the host B includes the HBA's 3 and 4. Each host 101 can communicate with the storage system 108 by using any one of its HBA's 105.

The storage system 108 is a disk array system which includes a plurality of disk drives (not shown) and a controller 110 for controlling the disk drives. One or more logical units (LU's) 109 are set in the storage system 108.

The LU 109 is a unit recognized as one disk drive by the host 101. The LU 109 is logically one disk drive, but it may physically be one disk drive or a partial area of one disk drive. Alternatively, the LU 109 may be a partial or entire area of a plurality of disk drives. In the example of FIG. 1, four LU's 109 are set in the storage system 108. Here, the LU's 1 to 4 are LU's 109 whose LU identifiers (LU-ID's) are "1" to "4".

The controller 110 includes one or more channel adaptors (CHA's) 107. The channel adaptor is an interface for connection with the host. The CHA 107 communicates with the host 101 via the SAN 106. In the example of FIG. 1, three CHA's 107 are disposed in the storage system 108. In FIG. 1, the CHA's 1 to 3 are CHA's 107 whose CHA identifiers (CHA-ID's) are "1" to "3". The storage system 108 can communicate with the host 101 by using any one of the CHA's 107.

The CHA 107 includes at least a CPU 111, a main memory 112, and a cache memory 113.

The CPU 111 is a processor for executing programs stored in the main memory 112.

Figure 3:
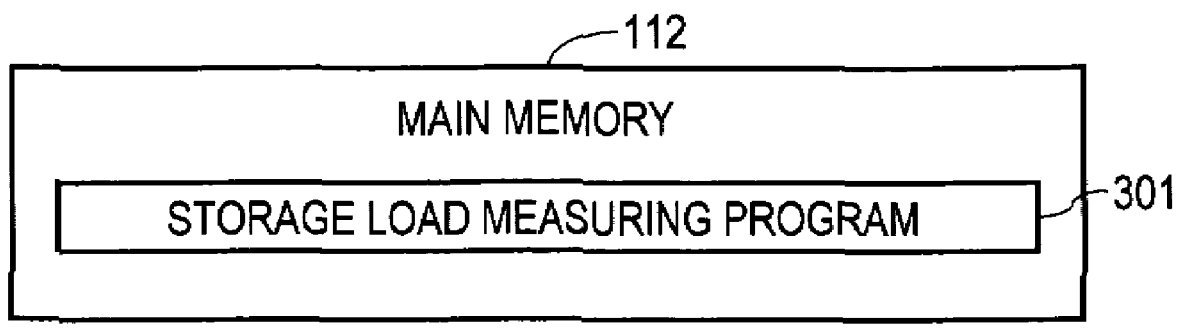
FIG. 3 is an explanatory diagram of a program stored in a main memory of a storage system according to the embodiment of this invention.

For example, the main memory 112 is a semiconductor memory in which the program executed by the CPU 111 is as stored shown in FIG. 3.

The cache memory 113 is a memory in which data to be written in the LU 109 or data read from the LU 109 is temporarily stored. For example, upon reception of a data reading request from the host 101, if there is target data of the reading request in the cache memory 113, the CHA 107 returns the data from the cache memory 113 to the host 101 without accessing the LU 109. As a result, the access to the LU 109 (i.e., access to the disk drive constituting the LU 109) is omitted, whereby an access speed is increased.

A similar cache memory (not shown) may be disposed in the HBA 105.

The controller 110 may include, in addition to the CHA 107, a disk adaptor (not shown) connected to each disk drive, a switch (not shown) for switching connection between the CHA 107 and the disk adaptor, and the like.

The SAN 106 interconnects the HBA 105 of the host 101 and the CHA 107 of the storage system 108 to enable communication therebetween. Each HBA 105 can communicate with any one of the CHA's 107. Similarly, each CHA 107 can communicate with any one of the HBA's 105. The SAN 106 typically includes a fibre channel switch and a cable.

Here, the path is a data access path from the host 101 to the LU 109. In the example of FIG. 1, as there are two HBA's 105 and three CHA's 107, there are six paths from the host 101 to one LU. Each path is identified by a path ID. The path ID is defined by identifiers of an HBA, a CHA, and an LU (HBA-ID, CHA-ID, and LU-ID) through which the path passes. For example, a path ID of a path passing through an HBA 1 and a CHA 3 to reach an LU 2 is "132".

FIG. 2 is an explanatory diagram of the program stored in the main memory 103 according to the embodiment of this invention.

At least an application program 201, an alternate path management setting program 202, and an alternate path management program 203 are stored in the main memory 103 of each host 101. All these programs are executed by the CPU 102.

The alternate path management setting program 202 is a program for setting a parameter, or the like of the alternate path management program 203.

The alternate path management program 203 is a program for realizing load balance of this invention. The alternate path management program 203 sets an active path for each LU 109 by an algorithm described below. Data access (I/O) requested from the application program 201 is executed via the path set by the alternate path management program 203.

The alternate path management program, 203 contains a host load measuring subprogram 204, an active path setting subprogram 205, and a report subprogram 209.

The report subprogram 209 outputs information regarding active path setting, information regarding a load status of each path, and the like to the input/output device 104. The report subprogram 209 outputs these pieces of information at least when an active path is reset.

The active path will be described later by referring to FIG. 4.

Additionally, the active path setting subprogram 205 contains an initial active path setting subprogram 206, an active path resetting subprogram A 207, and an active path resetting subprogram B 208.

These subprograms will be described later in detail.

FIG. 3 is an explanatory diagram of the program stored in the main memory 112 according to the embodiment of this invention.

At least a storage load measuring program 301 is stored in the main memory 112 of each CHA 107.

The storage load measuring program 301 is a program for measuring an access load on each CHA 107. For example, the access load to be measured is the number of accessing times (i.e., number of data I/O times) a unit time, an I/O data amount a unit time, a usage rate of the CPU 111, or the like.

According to the embodiment of this invention, the CPU 111 of each CHA 107 executes the storage load measuring program 301. However, this invention can be implemented by executing the storage load measuring program 301 by anther processor. For example, a management processor (not shown) may be provided for managing the entire storage system 108, and this management processor may measure a load on each CHA 107 by executing the storage load measuring program 301.

FIG. 4 is an explanatory diagram of a path table according to the embodiment of this invention.

A path table 400 is stored in the main memory 103 of each host 101, and contains information indicating statuses of all paths present between each host and the storage system 108 connected thereto. FIG. 4 shows, as an example, contents of the path table 400 stored in the main memory 103 of the host A of FIG. 1. Accordingly, FIG. 4 shows information regarding all the paths from the HBA's 1 and 2 to each LU 109.

In the main memory 103 of the host B, a path table 400 similar to that of FIG. 4 is stored regarding all the paths from the HBA's 3 and 4 to each LU 109.

The path table 400 is created by the initial active path setting subprogram 206 when an operating system (OS, not shown) of the host A is started. Then, the path table 400 is updated by the host load measuring subprogram 204, the active path resetting subprogram A 207, and the active path resetting subprogram B 208.

In the path table 400, a path number 401 is a number of a path uniquely added to each of all the paths regarding the host A. A new path number 401 is added each time a new path is discovered.

A failure status 402 indicates an occurrence of a failure in a path. If no failure occurs in any one of the HBA 105, the CHA 107, and the LU 109 constituting the path, a value of the failure status 402 becomes "No". On the other hand, if a failure occurs in any one of them, a value of the failure status 402 becomes "Yes". A path in which a value of the failure status 402 is "Yes" cannot be set as an active path (described later).

When the host 101 issues an I/O passing through any one of the paths, and the HBA 105 returns a failure status, the initial active path setting subprogram 206, or the like determines that a failure occurs in the path, and sets a value of the failure status 402 of the path to "Yes". If a failure occurs in any one of the LU's 109, a value of the failure status 402 of all the paths reaching the LU 109 becomes "Yes".

Active information 403 indicates setting of a path as an active path. If the path is set as an active path, a value of the active information 403 becomes "Yes". If the path is not set as an active path, a value of the active information 403 becomes "No".

Here, the active path is a path through which access (I/O) from the host 101 to the LU 109 passes. A path not set as an active path is a standby path which does not contribute to data access. For example, in FIG. 3, there are six accessible paths whose path numbers 401 are "1" to "6" between the host 101 and the LU 1. In reality, however, the host 101 accesses the LU 1 only via the active paths (only paths whose path numbers 401 are "1" in the example of FIG. 3).

The active path is first set by the initial active path setting subprogram 206. Subsequently, when needed (e.g., when a failure occurs in the active path, or when a load concentrates on a particular part), one standby path is set (reset) as a new active path, and the original active path is set as a standby path by the active path resetting subprogram A 207 and the active path resetting subprogram B 208. The setting and the resetting of the active path will be described later in detail.

An HBA-ID 404 is an identifier (HBA-ID) of the HBA 105 through which a path passes.

A CHA-ID 405 is an identifier (CHA-ID) of the CHA 107 through which a path passes.

An LU-ID 406 is an identifier (LU-ID) which a path reaches.

The HBA-ID 404, the CHA-ID 405, and the LU-ID 406 are obtained by a command issued from the initial active path setting subprogram 206, or the like to obtain a port number, a target number, and an LU number of a SCSI address. The obtained port, target, and LU numbers respectively correspond to the HBA-ID 404, the CHA-ID 405, and the LU-ID 406.

A combination of the HBA-ID 404, the CHA-ID 405, and the LU-ID 406 is a path ID of each path.

Figure 10:
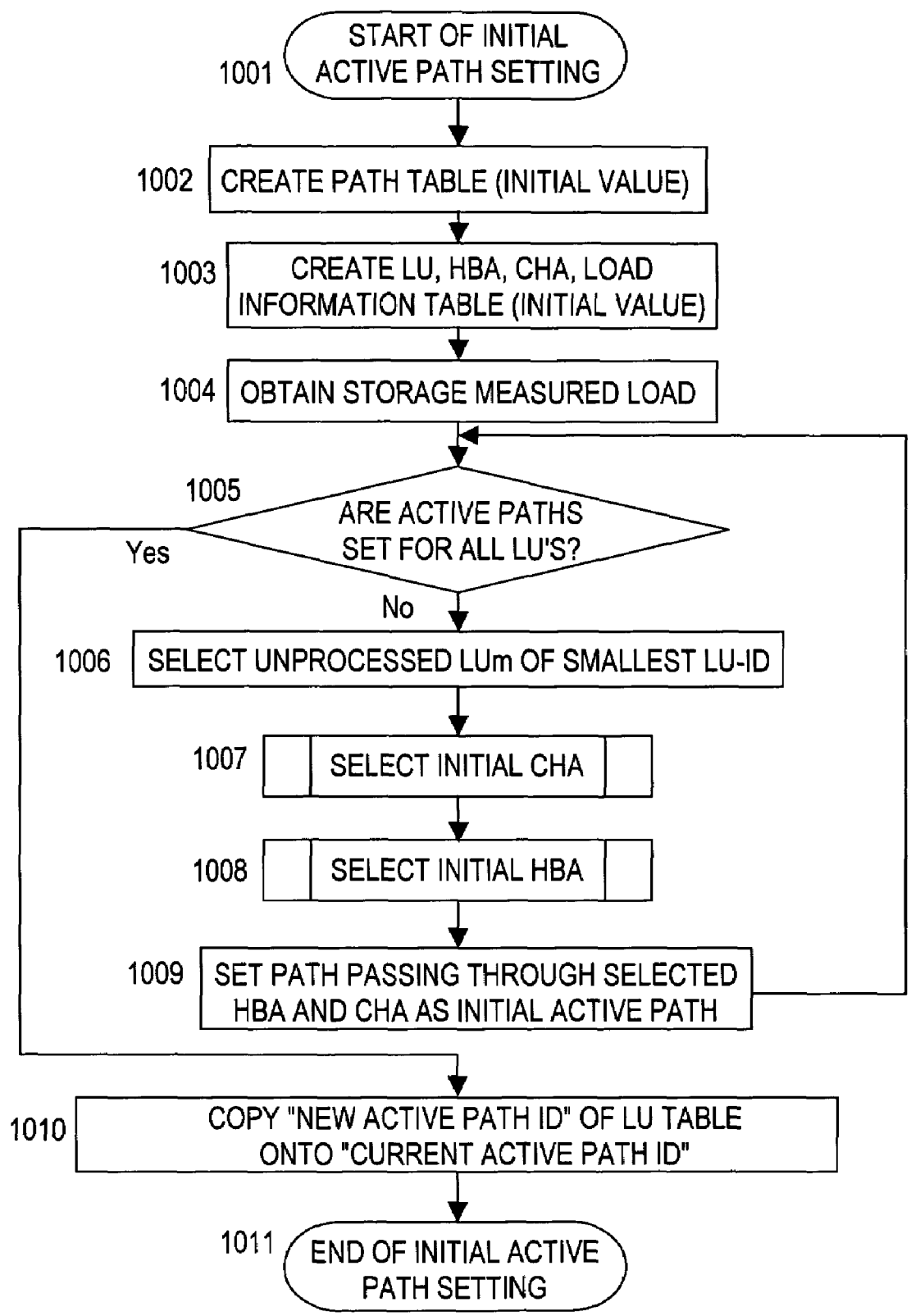
FIG. 10 is a flowchart of an initial active path setting subprogram according to the embodiment of this invention.

A measured load 407 indicates an amount of a load actually measured for each path by the host 101. The amount of a load is the number of accessing (I/O) times or an access data amount in a predetermined time period measured by the host load measuring subprogram 204 (FIG. 10).

The number 408 of active-path-set LU's indicates the number of LU's 109 in which paths are set as active paths. The number 408 of active-path-set LU's in which the active information 403 is "Yes" is "1", and the number 408 of activepath-set LU's in which the active information 403 is "No" is "0". The number 408 of active-path-set LU's is updated when an active path is changed.

The setting of the path table 400 will be described later by taking a specific example.

FIG. 5 is an explanatory diagram of an LU table according to the embodiment of this invention.

An LU table 500 is stored in the main memory 103 of each host 101, and contains information indicating statuses of all the LU's 109 of paths present between the LU's and each host 101. The LU table 500 is created by the initial active path setting subprogram 206 based on the path table 400 when the OS of each host is started. Then, the LU table 500 is updated by the host load measuring subprogram 204, the active path resetting subprogram A 207, and the active path resetting subprogram B 208. FIG. 5 shows, as an example, contents of the LU table 500 stored in the main memory 103 of the host A of FIG. 1. As there are paths between the LU's 109 (LU 1 to LU 4) and the host A in FIG. 1, FIG. 5 shows information regarding the LU 1 to LU 4.

According to the embodiment, as described later, there are paths between the host B and the LU 1 to LU 4. Thus, in the main memory 103 of the host B, an LU table 500 similar to that of FIG. 5 is stored regarding the LU 1 to LU 4.

In the LU table 500, an LU-ID 501 is an LU-ID to identify each LU 109. In the example of FIG. 5, values of the LU-ID 501 are "1" to "4".

A measured load 502 indicates an amount of a load actually measured for each LU 109 by the host 101. A value of the measured load 502 of each LU is equal to that of the measured load 407 of the path table 400. For example, the measured load 502 of the LU 109 in which the LU-ID 401 is "1" (i.e., LU 1) is a value of the measured load 407 of the path in which the LU-ID 406 of the path table 400 is "1" (in the examples of FIGS. 4 and 5, a value "1500" of the measured load 407 whose path number 401 is "1").

The value of the measured load 502 is cleared to be set to "0" when an active path is reset.

A path ID 503 of a current active path indicates a path ID of a path set as a current path for each LU 109. In other words, it is a path ID of a path in which the number 408 of active-path-set LU's is "1" in the path table 400.

A path ID 504 of a new active path indicates a path ID of a path set as a new active path for each LU 109 when an active path is reset. If a path to be set as a new active path has not yet been established, a value of the path ID 504 of the new active path becomes "−1".

The setting of the LU table 500 will be described later by taking a specific example.

FIG. 6 is an explanatory diagram of an HBA table according to the embodiment of this invention.

An HBA table 600 is stored in the main memory 103 of each host 101, and contains information indicating statuses of all the HBA's 105 of each host 101. The HBA table 600 is created by the initial active path setting subprogram 206 based on the path table 400 when the OS of each host 101 is started. Then, the HBA table 600 is updated by the host load measuring subprogram 204, the active path resetting subprogram A 207, and the active path resetting subprogram B 208.

FIG. 6 shows, as an example, contents of the HBA table 600 stored in the main memory 103 of the host A of FIG. 1. As the host A includes the HBA's 1 and 2, FIG. 6 shows information regarding the HBA's 1 and 2.

The host B includes the HBA's 3 and 4. Thus, in the main memory 103 of the host B, an HBA table 600 similar to that of FIG. 6 is stored regarding the HBA's 3 and 4.

In the HBA table 600, an HBA-ID 601 identifies each HBA 105. In the example of FIG. 6, a value of the HBA-ID 601 is "1" to "2".

A measured load 602 indicates an amount of a load actually measured for each HBA 105. A value of the measured load 602 of each HBA 105 is equal to a total of values of the measured loads 407 of the path table 400 for the relevant HBA-ID 404. For example, the measured load 602 of the HBA 105 in which the HBA-ID 601 is "1" (i.e., HBA 1) is equal to a total value ("2300" in the examples of FIGS. 4 and 6) of the measured loads 407 of the paths in which HBA-ID's 404 of the path table 400 are "1".

The value of the measured load 602 is cleared to be set to "0" when an active path is reset.

In an allocated load 603, a value of a load on an active path allocated to each HBA 105 is stored when an active path is reset.

A value of the allocated load 603 is cleared to be set to "0" when the active path is reset.

The number 604 of active-path-set LU's indicates the number of LU's 109 reached by each HBA 105 set as an active path. A value of the number 604 of active-path-set LU's of each HBA 105 is equal to a total value of the number 408 of active-path-set LU's of the path table 400 for the relevant HBA-ID 404. For example, the number 604 of active-path-set LU's of the HBA 105 in which the HBA-ID 601 is "1" (i.e., HBA 1) is equal to a total value of the number 408 of active-path-set LU's of the paths of the path table 404 in which the HBA-ID's 404 are "1".

In the example of FIG. 4, paths whose path numbers 401 are "1", "11", "15", and "22" are set as active paths. Among these paths, HBA-ID's 404 of the two paths whose path numbers 401 are "1" and "15" are "1". Thus, the number 604 of active-path-set LU's of the HBA 1 becomes "2". In this case, the HBA 1 is set as an active path to reach two LU's 109 (LU 1 and LU 3 in the example of FIG. 4). In other words, the I/O issued from the host A to the LU 1 and LU 3 passes through the HBA 1.

The value of the number 604 of active-path-set LU's is accordingly updated when the active path is changed.

The setting of the HBA table 600 will be described later by taking a specific example.

FIG. 7 is an explanatory diagram of a CHA table according to the embodiment of this invention.

A CHA table 700 is stored in the main memory 103 of each host 101, and contains information indicating statuses of all the CHA's 107 which have paths with each host 101. The CHA table 700 is created by the initial active path setting subprogram 206 based on the path table 400 when the OS of each host 101 is started. Then, the CHA table 700 is updated by the host load measuring subprogram 204, the active path resetting subprogram A 207, and the active path resetting subprogram B 208.

FIG. 7 shows, as an example, contents of the CHA table 700 stored in the main memory 103 of the host A of FIG. 1. As there are paths between the host A and the CHA's 1 to 3 in FIG. 1, FIG. 7 shows information regarding the CHA's 1 to 3.

There are also paths between the host B and the CHA's 1 to 3. Thus, in the main memory 103 of the host B, a CHA table 800 similar to that of FIG. 7 is stored regarding the CHA's 1 to 3.

In the CHA table 700, a CHA-ID 701 identifies each CHA 107. In the example of FIG. 7, a value of the CHA-ID 701 is "1" to "3".

A measured load 702 indicates an amount of a load actually measured for each CHA 107 by the host A. A value of the measured load 702 is equal to the number of I/O times, an I/O data amount, or the like measured by the host A as described later by referring to FIG. 9. A value of the measured load 702 of each CHA 107 is equal to a total value of the measured loads 407 of the path table 400 for the relevant CHA-ID's 405.

In the example of FIG. 4, paths whose path numbers 401 are "1", "11", "15", and "22" are set as active paths. Among these paths, CHA-ID's 405 of the two paths whose path numbers 401 are "1" and "22" are "1", and measured loads 407 thereof are respectively "1500" and "500". Thus, the measured load 702 of the CHA 107 whose CHA-ID 701 is "1" (i.e. CHA 1) is equal to a total value "2000" of "1500" and "500". Similarly, the measured loads 702 of the CHA's 2 and 3 are respectively "1200" and "800".

Each CHA 107 may receive I/O's from a plurality of hosts 101. However, each host 101 cannot know how many I/O's the other hosts 101 have issued to each CHA 107. Thus, the measured load 702 of the CHA table 700 of the host A is a load by an I/O issued from the host A among all the I/O's actually received by each CHA 107.

The value of the measured load 702 is cleared to be set to "0" when an active path is reset.

In an allocated load 703, a value of a load on an active path allocated to each CHA 107 is stored when an active path is reset.

A value of the allocated load 703 is cleared to be set to "0" when the active path is reset.

The number 704 of own host active-path-set LU's indicates the number of LU's 109 reached by each CHA 107 set as an active path by the host A. Each CHA 107 may be set as an active path from a plurality of hosts 101. However, each host 101 cannot know how many active paths the other hosts 101 have set for each CHA 107. Thus, the number 704 of own host active-path-set LU's of the host A is equal to the number of paths set by the host A among the numbers of active paths set for each CHA 107.

A value of the number 704 of active-path-set LU's of each CHA 107 is equal to a total value of the number 408 of active-path-set LU's of the path table 400 for the relevant CHA-ID 405. For example, the number 704 of active-path-set LU's of the CHA 107 in which the CHA-ID 701 is "1" (i.e., CHA 1) is equal to a total value of the number 408 of active-path-set LU's of the paths of the path table 400 in which the CHA-ID's 405 are "1".

In the example of FIG. 4, the paths whose path numbers 401 are "1", "11", "15", and "22" are set as active paths. Among these paths, CHA-ID's 405 of the two paths whose path numbers 401 are "1" and "22" are "1". Thus, the number 704 of active-path-set LU's of the CHA 1 becomes "2". In this case, the CHA 1 is set as an active path to reach the two LU's 109 (LU 1 and LU 4 in the example of FIG. 4). In other words, the I/O issued from the host A to the LU 1 and the LU 4 passes through the CHA 1.

The value of the number 704 of active-path-set LU's is accordingly updated when the active path is changed.

The setting of the CHA table 700 will be described later by taking a specific example.

The LU, HBA, and CHA tables 500, 600, and 700 can be created by the following method.

For example, the HBA 105 of the host 101 may detect the LU 109, and the OS of the host 101 may obtain information regarding the detected LU 109 from the HBA 105. The host 101 can obtain information regarding a path (e.g., information indicating which HBA 105 or CHA 107 is passed, or the like) by using a SCSI command for the detected LU 109. The host 101 figures out the LU 109, the HBA 105, and the CHA 107 which can be used, and can accordingly create the LU, HBA, and CHA tables 500, 600, and 700. As described above, the host 101 can detect the LU 109 and the CHA 107 which can be used.

When a plurality of hosts 101 can detect the same LU 109 and the same CHA 107, the plurality of hosts 101 share the detected same LU 109 and CHA 107.

On the other hand, an LU 109 that the OS of the host 101 cannot detect can be set by a zoning function of a fibre channel switch (not shown) of the SAN 106, an LUN masking function of the storage system 108, or the like. Accordingly, by these functions, the plurality of hosts 101 can be set to use different LU's 109.

FIG. 8 is an explanatory diagram of a load information table according to the embodiment of this invention.

A load information table 800 is stored in the main memory 103 of each host 101, and contains information regarding loads on all the CHA's 107 which have paths with each host 101. The load information table 800 is created based on the measured load 702 of the CHA table 700 and a load measured by the storage load measuring program 301.

FIG. 8 shows, as an example, contents of the load information table 800 stored in the main memory 103 of the host A of FIG. 1. As there are paths between the host A and the CHA's 1 to 3 in FIG. 1, FIG. 8 shows information regarding loads on the CHA's 1 to 3.

There are also paths between the host B and the CHA's 1 to 3. Thus, in the main memory 103 of the host B, a load information table 800 similar to that of FIG. 8 is stored regarding the CHA's 1 to 3.

In the load information table 800, a CHA-ID 801 identifies each CHA 107. In the example of FIG. 8, a value of the CHA-ID 801 is "1" to "3".

A storage measured load 802 indicates an amount of a load in a predetermined time period actually measured by the storage load measuring program 301 of the storage system 108. A value of the storage measured load 802 is equal to the number of I/O times, an I/O data amount, or the like in a predetermined time period measured by the storage load measuring program 301. Each host 101 obtains the storage measured load 802 by issuing, e.g., a SCSI inquiry command to the storage system 108 at an initial setting time shown in FIG. 10 or a resetting time of an active path shown in FIG. 18.

For example, an accumulated value of loads measured by the storage load measuring program 301 may be held in the main memory 112 or the like. In this case, each host 101 obtains the accumulated value for each predetermined time, and holds the last obtained accumulated value in the main memory 103 or the like. Then, a difference between a currently obtained accumulated value and the last obtained accumulated value may be calculated to be set as a storage measured load 802. As a result, the storage measured load 802 becomes an amount of a load in a predetermined time period.

In the example of FIG. 8, storage measured loads 802 of the CHA's 1 to 3 are respectively "2400", "2200", and "3000".

An own host measured load 803 indicates an amount of a load actually measured for each CHA 107 by the host A. In other words, the own host measured load 803 of the host A is equal to a value of the measured load 702 of the CHA table 700 of the host A.

Another host load 804 indicates an amount of a load by access from a host 101 other than the host A. When a plurality of hosts 101 other than the host A are connected to each CHA 107, another host load 804 is a total amount of loads by access from the plurality of hosts 101. In the example of FIG. 1, the hosts A and B only are connected to each CHA 107, and thus another host load 804 of FIG. 8 is an amount of a load by access from the host B.

The storage measured load 802 is an amount of loads by access from all the hosts 101, and the own host measured load 803 is an amount of a load by access from the own host (host A). Thus, another host load 804 is calculated by subtracting the own host measured load 803 from the storage measured load 802. In the example of FIG. 8, the storage measured load 802 of the CHA 1 is "2400", and the own host measured load 803 is "2000". Accordingly, another host load 804 of the CHA 1 is "400" obtained by subtracting "2000" from "2400". Similarly, other host loads 804 of the CHA's 2 and 3 are respectively "1000" and "2200".

Next, processing executed by each program of the embodiment will be described. FIGS. 9 to 19 show an example of processing executed by the host A of FIG. 1 for convenience. The host B of FIG. 1 executes similar processing.

Figure 9:
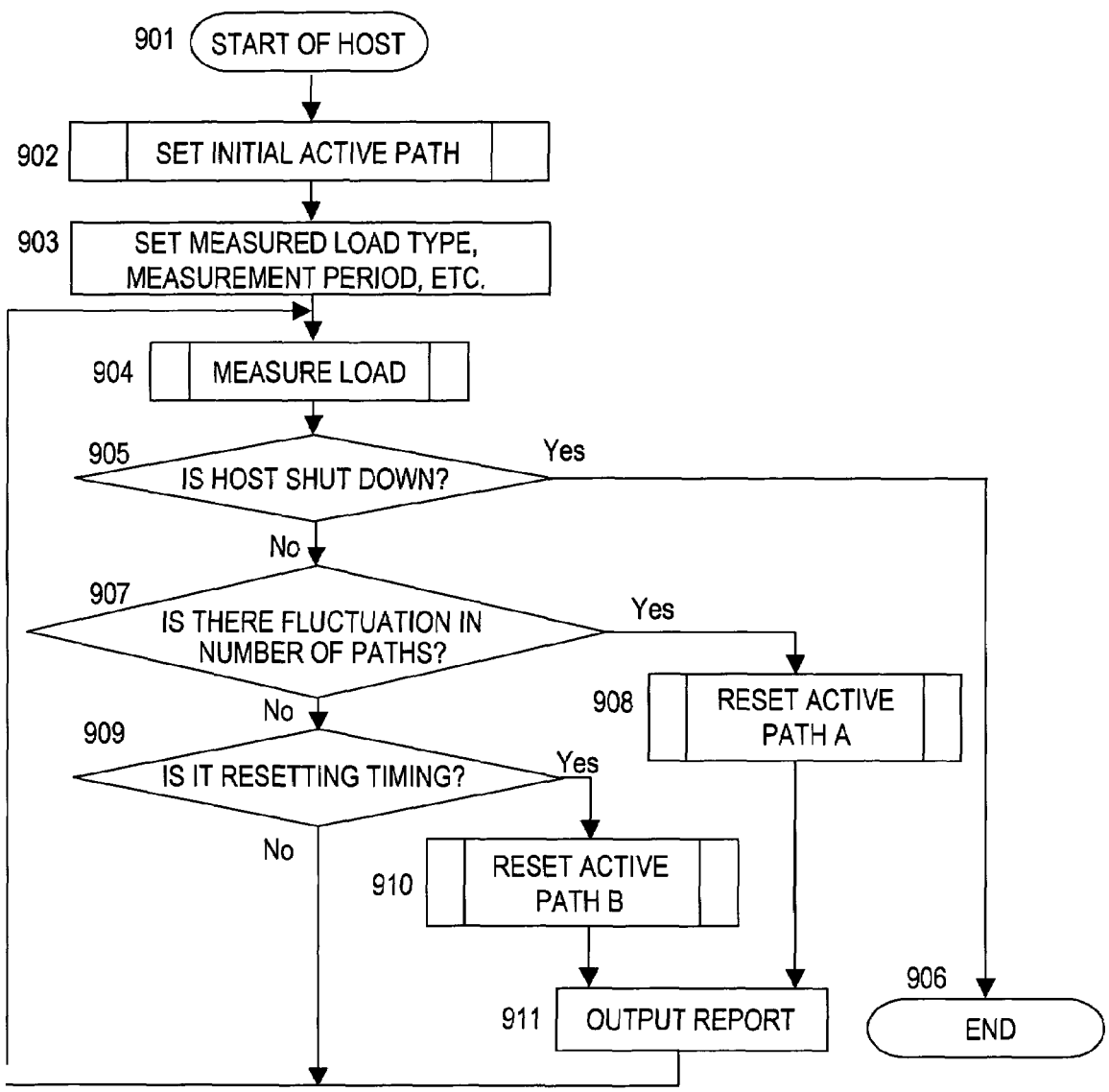
FIG. 9 is a flowchart of an alternate path management program according to the embodiment of this invention.

FIG. 9 is a flowchart of the alternate path management program 203 according to the embodiment of this invention.

Figure 11:
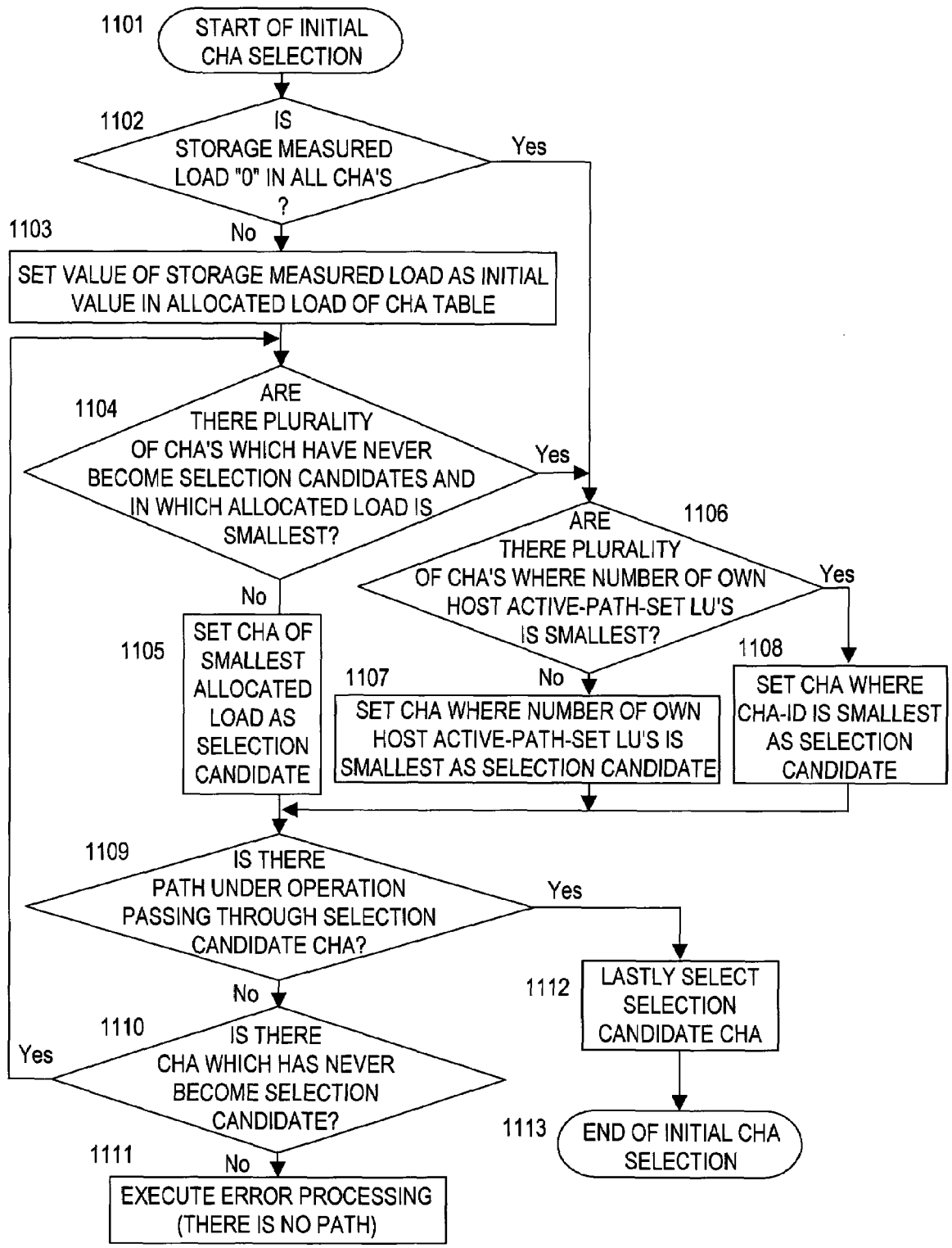
FIG. 11 is a flowchart of initial CHA selection processing according to the embodiment of this invention.
Figure 12:
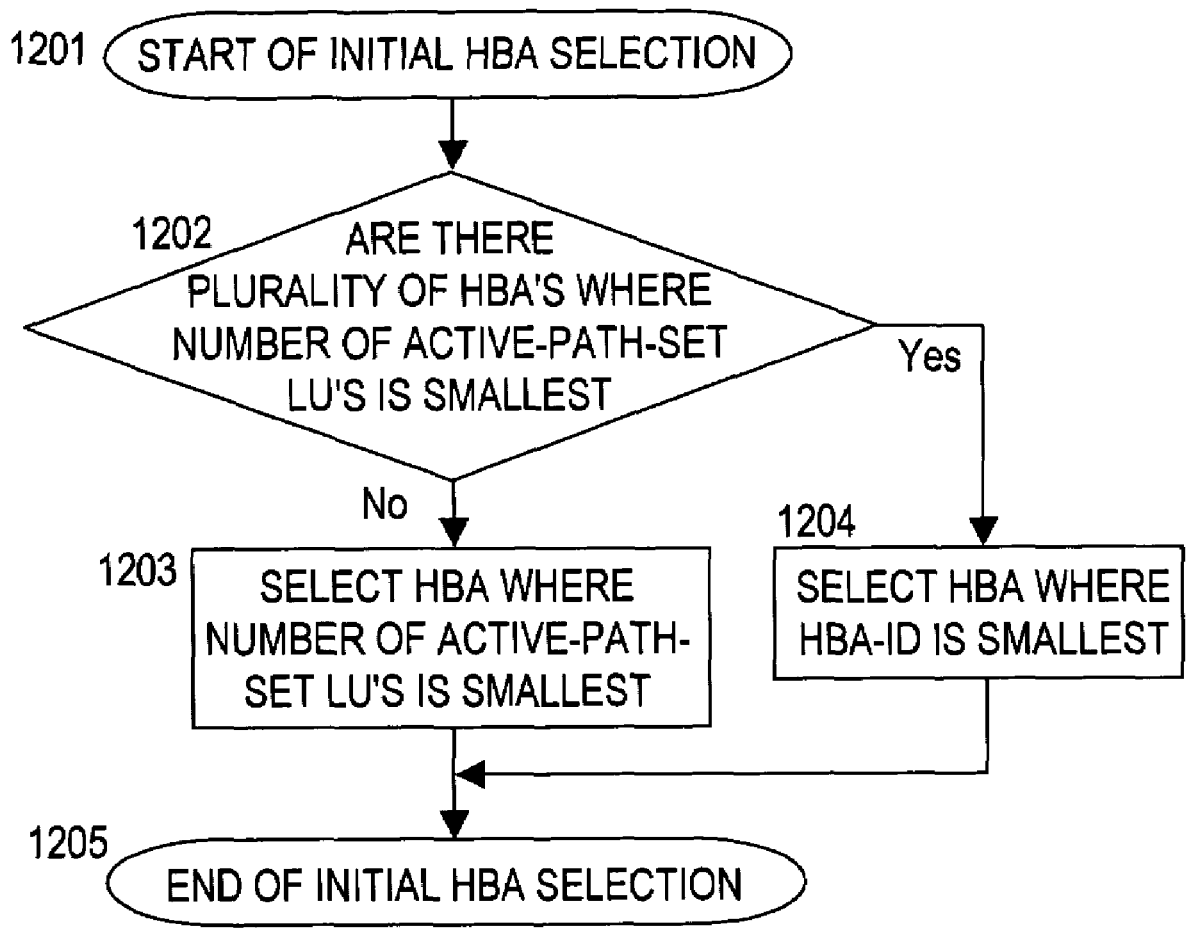
FIG. 12 is a flowchart of initial HBA selection processing according to the embodiment of this invention.

Immediately after a start of the OS of the host A, an active path is not set even if there is a usable path between the host A and each LU 109 in the storage system 108. Thus, upon the start of the OS of the host A, execution of the alternate path management program 203 is started (901), and an active path is set (902). In explanation below, the active path first set by the alternate path management program 203 will be described as an initial active path. Referring to FIGS. 10 to 12, specifically, the initial active path setting subprogram 206 called by the alternate path management program 203 sets the initial active path.

Next, the alternate path management program 203 calls the alternate path management setting program 202 to set a measured load type and a measuring period (903).

The measured load type is a target to be measured by the host load measuring subprogram 204. As a value indicating a load imposed by accessing from the host 101, "number of I/O's", "I/O data amount", "CPU usage rate", or the like is available. According to the embodiment, one of the "number of I/O's" and the "I/O data amount" is set as the measured load type. A user of the host A can set one of the "number of I/O's" and the "I/O data amount". However, even if other values indicating loads are set, this invention can be implemented.

The measuring period is a period of measuring a set measuring target by the host load measuring subprogram 204, and an optional period is set by the user of the host A.

Next, the alternate path management program 203 measures a load in accordance with the setting of the step 903 (904). Referring to FIG. 12, specifically, the host load measuring subprogram 204 called by the alternate path management program 203 measures the load in accordance with the setting of the step 903. For each I/O (i.e., data access), the host load measuring subprogram 204 measures a load imposed by the access.

For example, when "number of I/O's" is set as a measured load type, and "1 hour" is set as a measuring period, the host load measuring subprogram 204 measures the number of I/O's per hour for each LU 109, and stores the measured value as a measured load 407 in the path table 400.

Next, the alternate path management program 203 determines whether the host A is shut down or not (905). Specifically, determination is made as to whether the user of the host A has issued a command to shut down the host 101 or not. If the host 101 is shut down, the alternate path management program 203 is completed (906).

On the other hand, if the host A is not shut down, the alternate path management program 203 determines whether a fluctuation has occurred or not in the number of paths (907). Here, the occurrence of a fluctuation means a stoppage of an active path or addition of a new usable path. The stoppage of the active path means a case where the alternate path management program 203 detects a failure in a device (i.e., HBA 105 or CHA 107) constituting the active path, removal of one of these devices, or the like. The addition of the new usable path means a case where the alternate path management program 203 detects a recovery of the device from the failure, an addition of a new device, or the like.

If a fluctuation has occurred in the number of paths, the alternate path management program 203 resets an active path (908). Referring to FIGS. 14 to 17, specifically, the active path resetting subprogram A 207 called by the alternate path management program 203 resets an active path.

"Resetting" of the active path is processing for reexamining the set active path, and resets an active path to balance loads more uniformly.

On the other hand, if no fluctuation has occurred in the number of paths, the alternate path management program 203 determines timing of resetting an active path (909). Specifically, determination is made as to a passage of the measuring period set in the step 903.

Figure 18:
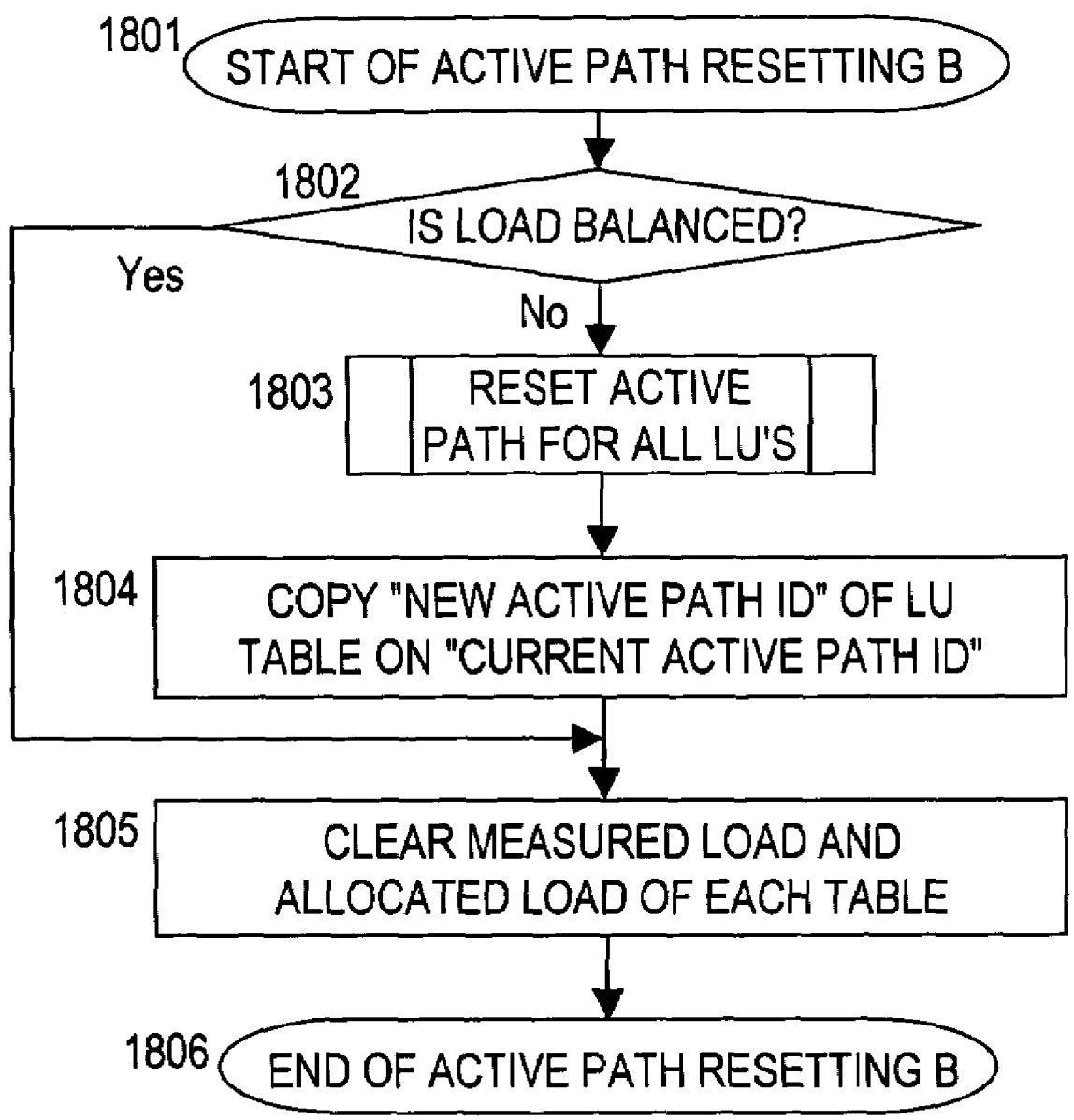
FIG. 18 is a flowchart of an active path resetting subprogram B according to the embodiment of this invention.
Figure 19:
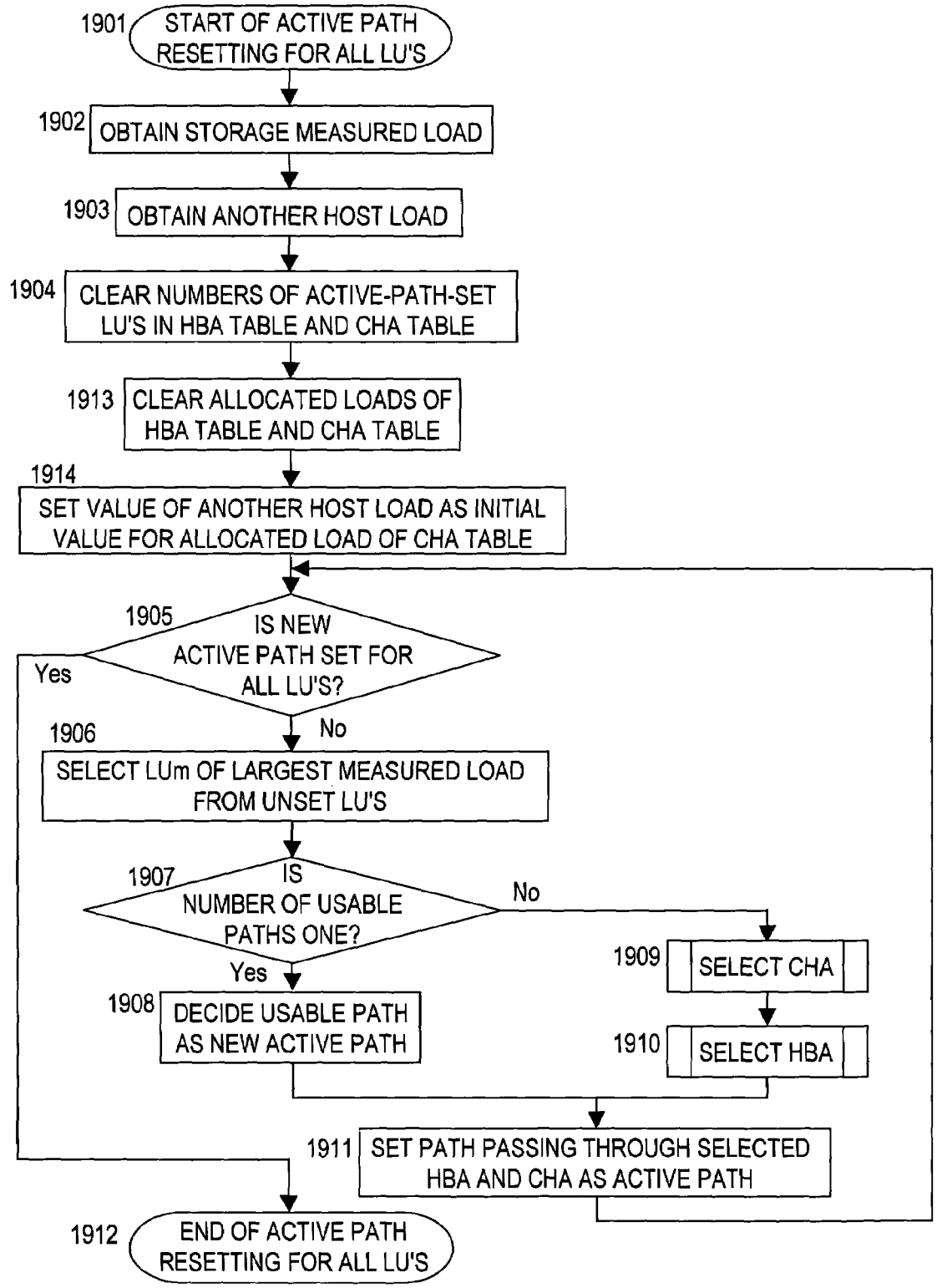
FIG. 19 is a flowchart of active path resetting processing of all LU's according to the embodiment of this invention.

The user of the host A can preset an interval of resetting an active path (e.g., 1 hour, 1 day, 1 week, 1 month, or 1 year) as the measuring period. If the user sets "1 hour", in the step 909, determination is made as to a passage, of 1 hour after last resetting of an active path (or initial setting). If the passage of 1 hour is determined, since it is timing to reset an active path, the alternate path management program 203 resets an active path (910). Referring to FIGS. 18 and 19, specifically, the active path resetting subprogram B 208 called by the alternate path management program 203 resets an active path.

The resetting of the active path may be executed not only based on the predetermined interval but also upon reception of a request from the user of the host A. In this case, in the step 909, the alternate path management program 203 determines whether the user has issued an active path resetting request or not. If the issuance of a resetting request is determined, since it is timing to reset an active path, the process proceeds to a step 910.

On the other hand, if the passage of the predetermined time is not determined, and if the issuance of a resetting request from the user is not determined, since it is not timing to reset an active path, the process returns to the step 904.

Upon the execution of the active path resetting subprogram A 207 or the active path resetting subprogram B 208, the alternate path management program 203 next outputs a report (911). Specifically, the report subprogram 209 called by the alternate path management program 203 displays information regarding the reset active path to the input/output device 104 of the host A. After the output of the report, the process returns to the step 904.

FIG. 10 is a flowchart of the initial active path setting subprogram 206 according to the embodiment of this invention.

In the step 902 of FIG. 9, the alternate path management program 203 calls to start the execution of the initial active path setting subprogram 206 (1001). At this time, the alternate path management program 203 recognizes all the LU's 109 to be accessed from the host A (in the example of FIG. 1, LU 1 to LU 4).

At the beginning, the initial active path setting subprogram 206 creates the path table 400 (1002). At a point of this time, values of the path table 400 are all initial values. In other words, values of a failure status 402 and active information 403 are all "No", and values of a measured load 407 and a number 408 of active-path-set LU's are all "0".

Next, the initial active path setting subprogram 206 creates an LU table 500, an HBA table 600, a CHA table 700, and a load information table 800 (1003). At a point of this time, values of the tables are all initial values. In other words, values of measured loads 502, 602, and 702, allocated loads 603 and 703, and numbers 604 and 704 of active-path-set LU's are all "0". Values of a storage measured load 802, an own host measured load 803, and another host load 804 are also all "0". Values of a current active path ID 503 and a new active path ID 504 are undecided.

Next, the initial active path setting subprogram 206 obtains a storage measured load for each CHA 107 (1004). Specifically, the initial active path setting subprogram 206 issues an inquiry command of SCSI, obtains a load measured by the storage load measuring program 301, and stores its value as the storage measured load 802 of the load information table 800. If the obtained value is a load accumulative value, a load per predetermined time is calculated from the obtained value, and stored.

Next, the initial active path setting subprogram 206 determines whether active paths have been set or not for all the LU's 109 (1005).

If it is determined that active paths have not been set for all the LU's 109, the initial active path setting subprogram 206 selects an LU 109 for which an active path has not been set and whose LU-ID is smallest in value (referred to as LUm hereinafter, "m" meaning LU-ID) (1006).

Next, the initial active path setting subprogram 206 sequentially executes initial CHA selection processing (1007) and initial HBA selection processing (1008) for the selected LUm. Referring to FIGS. 11 and 12, these operations will be described later in detail.

Next, the initial active path setting subprogram 206 sets a path passing through the HBA 105 and the CHA 107 selected in the steps 1007 and 1008 (referred to as "path A" in the description with reference to FIG. 10) as an active path to the LUm (initial active path) (1009).

Specifically, in the path table 400, active information 403 corresponding to a path ID of the path A is set to "YES". "1" is added to the number 408 of active-path-set LU's corresponding to the path ID of the path A. In the HBA table 600, "1" is added to the number 604 of active-path-set LU's of an HBA-ID 601 corresponding to the path A. In the CHA table 700, "1" is added to the number 704 of own host active-path-set LU's of a CHA-ID 701 corresponding to the path A. Additionally, in the LU table 500, a path ID 504 of a new active path of the LU-ID corresponding to the path A is changed to a path ID of the path A.

Further, a value (i.e., average load) obtained by dividing a total of the storage measured loads 802 of all the CHA's 107 by the number of LU's 109 recognized by the host A is added to the allocated load 703 corresponding to the path A of the CHA table 700. At a point of this time, since there is no trace of access by the host A, an average load by the other host 101 is used in place of a load by the host A.

After the execution of the step 1009, the initial active path setting subprogram 206 returns to the step 1005.

On the other hand, in the step 1005, if it is determined that active paths have been set for all the LU's 109, the initial active path setting subprogram 206 copies a value of a path ID 504 of a new active path of the LU table 500 to the path ID 503 of the current active path to actually operate each of the set active paths (1010). As a result, the alternate path management program 203 starts an operation of the new active path. In other words, after the execution of the step 1010, the alternate path management program 203 allocates an I/O issued from the application program 201 to the new active path.

Thus, the execution of the initial active path setting subprogram 206 is completed (1011).

FIG. 11 is a flowchart of the initial CHA selection processing according to the embodiment of this invention.

In the step 1007 of FIG. 10, the initial CHA selection processing is executed by the initial active path setting subprogram 206. When executing the initial CHA selection processing, the initial active path setting subprogram 206 refers to the CHA table 700 and the load information table 800. A CHA 107 selected by this processing is set as an initial active path for the LUm selected in the step 1006 of FIG. 10.

Upon a start of the initial CHA selection processing (1101), the initial active path setting subprogram 206 first determines whether storage measured loads 802 are "0" or not for all the CHA's 107 recognized by the OS of the host A (1102).

If it is determined in the step 1102 that the storage measured loads 802 are "0" for all the CHA's 107, any one of the CHA's 107 has not been accessed by the host 101 other than the host A. In the example of FIG. 1, any one of the CHA's 107 has not been accessed by the host B. Further, at a point of this time, since there is no active path set from the host A, any one of the CHA's 107 has not been accessed by the host A or B after all. In this case, an active path cannot be set to dispose loads by referring to the loads measured in the past. Thus, the process proceeds to a step 1106 (described later).

On the other hand, if it is determined in the step 1102 that the storage measured loads 802 are not "0" for all the CHA's 107 (in other words, the storage measured load 802 is not "0" at least in one CHA 107), at least one CHA 107 has been accessed by the host B. In this case, an active path from the host A to each LU 109 must be set by considering access from the host B. For example, if access from the host B concentrates in any one of the CHA's 107, a load is properly balanced by setting an active path from the host A avoiding the CHA 107.

Thus, the initial active path setting subprogram 206 sets a value of the storage measured load 802 measured for each CHA 107 as an initial value in the allocated load 703 of the CHA table 700 (1103). At a point of this time, since each CHA 107 has not been accessed by the host A, the value of the storage measured load 802 is a value of a load imposed by the access from the host B.

Next, the initial active path setting subprogram 206 determines whether there are a plurality of CHA's 107 which have not become selection candidates and in which a value of the allocated load 703 is smallest or not among all the CHA's 107 (1104).

Here, the selection candidate is a candidate of the CHA 107 lastly selected as an initial active path. "Has not become a selection candidate" means that the CHA 107 has not become a selection candidate in the initial CHA selection processing. As described later, even when the CHA 107 becomes a selection candidate in the step 1105 or the like, if the CHA 107 cannot be used because of a failure or the like, the CHA 107 is removed from the selection candidates, and processing of the step 1104 and after is executed for the other CHA's 107. In the step 1104, the CHA 107 that has not become a selection candidate means a CHA 107 not removed in such a manner.

If it is determined in the step 1104 that there are not a plurality of CHA's 107 which have not become selection candidates and in which the value of the allocated load 703 is smallest, there is only one CHA 107 which has not become a selection candidate and the value of the allocated load 703 is smallest. To balance the load as uniformly as possible, the active path to the LUm is preferably allocated to the CHA 107 in which the value of the allocated load 703 is smallest. Accordingly, the initial active path setting subprogram 206 sets the CHA 107 in which the value of the allocated load 703 is smallest as a selection candidate (1105).

On the other hand, if it is determined in the step 1104 that there are a plurality of CHA's 107 which have not become selection candidates and in which the value of the allocated load 703 is smallest, a CHA 107 to be set as an active path must be selected from the plurality of CHA's 107. Accordingly, the initial active path setting subprogram 206 determines whether there are a plurality of CHA's 107 in which the number 704 of own host active-path-set LU's is smallest or not among the plurality of CHA's 107 which have not become selection candidates and in which the value of the allocated load 703 is smallest (1106).

If it is determined in the step 1106 that there are not a plurality of CHA's 107 in which the number 704 of own host active-path-set LU's is smallest, there is only one CHA 107 in which the value of the allocated load 703 is smallest and the number 704 of own host active-path-set LU's is smallest. To balance the load as uniformly as possible, the active path to the LUm is preferably allocated to the CHA 107 in which the number 704 of own host active-path-set LU's is smallest among the plurality of CHA's 107 in which the value of the allocated load 703 is smallest. Thus, the initial active path setting subprogram 206 sets the CHA 107 as a selection candidate (1107).

On the other hand, if it is determined in the step 1106 that there are a plurality of CHA's in which the number 704 of own host active-path-set LU's is smallest, the load is similarly balanced whichever one of the plurality of CHA's 107 is selected. Accordingly, the initial active path setting subprogram 206 sets a CHA 107 of a smallest CHA-ID 701 as a selection candidate among the plurality of CHA's 107 (1108).

Upon the setting of the CHA 107 as the selection candidate in the step 1105, 1107 or 1108, the initial active path setting subprogram 206 determines whether there is a path under operation passing through the CHA 107 as the selection candidate or not (1109). The path of the operative status is a path to enable transmission of an I/O from the host A to the LUm (i.e., usable path). For example, when a failure occurs in the CHA 107 as the selection candidate, there is no path under operation passing through the CHA 107 as the selection candidate. In this case, any paths passing through the CHA 107 as the selection candidate cannot be set as active paths.

If it is determined in the step 1109 that there is a path under operation passing through the CHA 107 as the selection candidate, the CHA 107 as the selection candidate can be set as an active path. Accordingly, the initial active path setting subprogram 206 lastly selects the CHA 107 as the selection candidate (1112), and completes the initial CHA selection processing (1113). Subsequently, as shown in FIG. 12, initial HBA selection processing is executed for the path of the operative status determined to be "present", in the step 1109, as a target.

If it is determined in the step 1109 that there is no path under operation passing through the CHA 107 as the selection candidate, the CHA 107 as the selection candidate cannot be set as an active path. Thus, the initial active path setting subprogram 206 removes the CHA 107 which is a selection candidate at this time from selection candidates. Then, determination is made as to whether there is a CHA 107 which has not become a selection candidate or not (1110).

If it is determined in the step 1110 that there is a CHA 107 which has not become a selection candidate, the process returns to the step 1104 to determine selection of the CHA 107.

On the other hand, if it is determined in the step 1110 that there is no CHA 107 which has not become a selection candidate, there is no CHA 107 which can be set as an active path to the LUm. Thus, error processing is executed (1111).

FIG. 12 is a flowchart of the initial HBA selection processing according to the embodiment of this invention.

In the step 1008 of FIG. 10, the initial HBA selection processing is executed by the initial active path setting subprogram 206. When executing the initial HBA selection processing, the initial active path setting subprogram 206 refers to the HBA table 600. An HBA 105 selected by this processing is set as an initial active path to the LUm selected in the step 1006 of FIG. 10.

Upon a start of the initial HBA selection processing (1201), the initial active path setting subprogram 206 first determines whether there are a plurality of HBA's 105 in which the number 604 of active-path-set LU's is smallest among target paths or not (1202). Here, the target path is a path under operation determined to be "present" in the step 1109 of the initial CHA selection processing of FIG. 11.

If it is determined in the step 1202 that there are not a plurality of HBA's 105 in which the number 604 of active-path-set LU's is smallest, there is only one HBA 105 in which the number 604 of active-path-set LU's is smallest. To balance a load as uniformly as possible, the active path to the LUm is preferably allocated to the HBA 105 in which the number 604 of active-path-set LU's is smallest. Accordingly, the initial active path setting subprogram 206 selects the HBA 105 (1203).

On the other hand, if it is determined in the step 1202 that there are a plurality of HBA's 105 in which the number 604 of active-path-set LU's is smallest, the load is similarly balanced whichever one of the plurality of HBA's 105 is selected. Thus, the initial active path setting subprogram 206 selects an HBA 105 of a smallest HBA-ID 601 among the plurality of HBA's 105 (1204).

Thus, the initial HBA selection processing is completed (1205).

According to the processing from FIGS. 10 to 12, if the host B has used the storage system 108 when the host A is started, by referring to the load imposed by the access from the host B, the active path of the host A is set to balance the load on each CHA as uniformly as possible. As a result, the load on each CHA is properly balanced even when many hosts 101 use the storage system 108.

Figure 13:
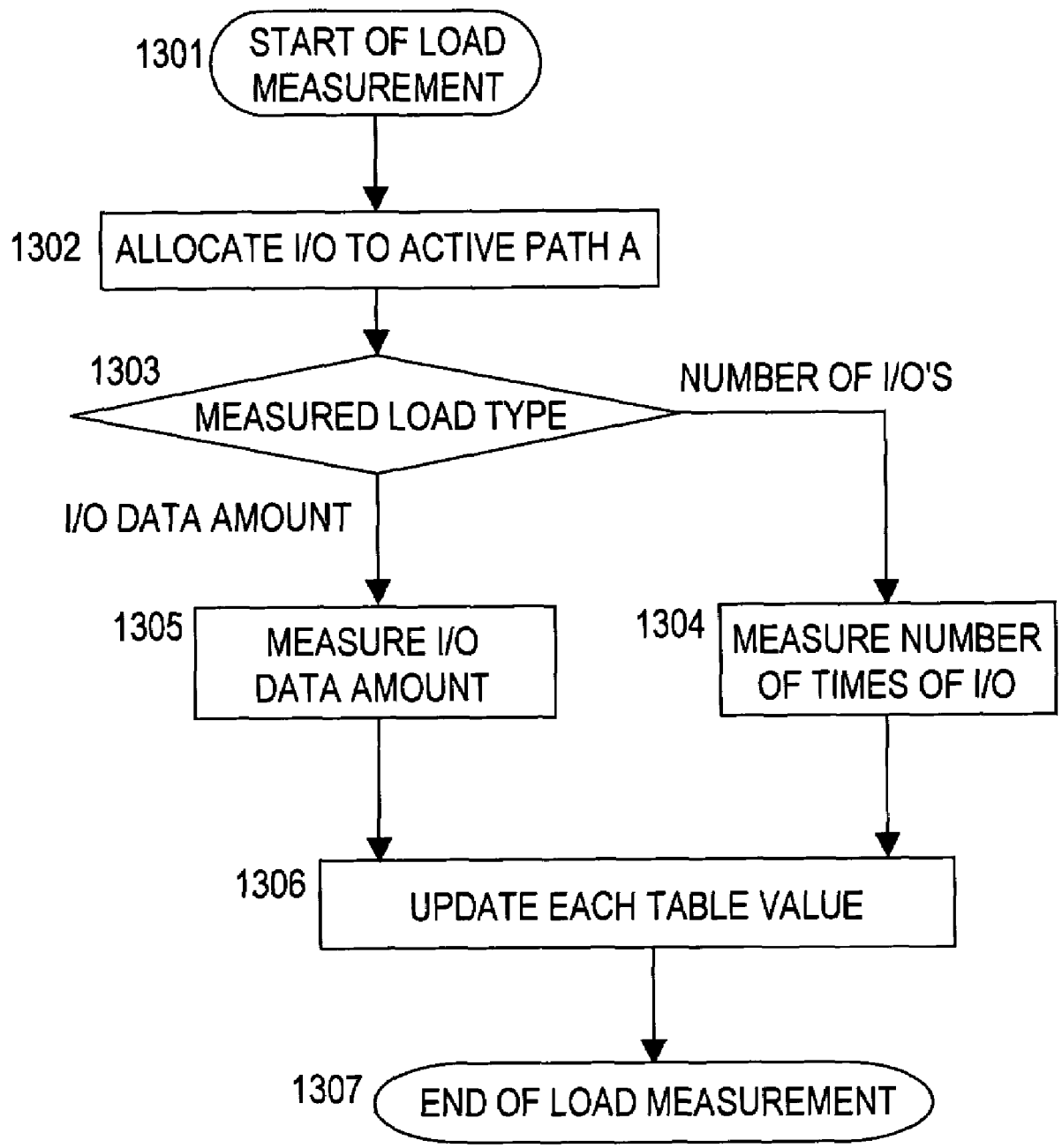
FIG. 13 is a flowchart of a host load measuring subprogram according to the embodiment of this invention.

FIG. 13 is a flowchart of the host load measuring subprogram 204 according to the embodiment of this invention.

Execution of the host load measuring subprogram 204 is started by calling the subprogram in the step 904 of FIG. 9 (1301).

First, the host load measuring subprogram 204 allocates data access (I/O) from the host 101 to any one of the LU's 109 to the active path A set for the LU 109 (1302).

Next, the host load measuring subprogram 204 determines a measured load type (1303). This measured load type is set in the step 903 of FIG. 9.

If it is determined in the step 1303 that "number of I/O's" is set as the measured load type, the host load measuring subprogram 204 measures the number of data I/O's for the active path A (1304).

On the other hand, if it is determined in the step 1303 that "I/O data amount" is set as the measured load type, the host load measuring subprogram 204 measures a data amount of data I/O for the active path A (1305).

Next, the host load measuring subprogram 204 updates the value of each table (1306). Specifically, a value measured in the step 1304 or 1305 is added to a value of the measured load 407 for the active path A of the path table 400. Further, in the LU table 500, the HBA table 600, and the CHA table 700, the values measured in the step 1304 or 1305 is added to the values of the measured loads 502, 602, and 702 of the LU, HBA and CHA included in the active path A.

Thus, the execution of the host load measuring subprogram 204 is completed (1307).

Figure 14:
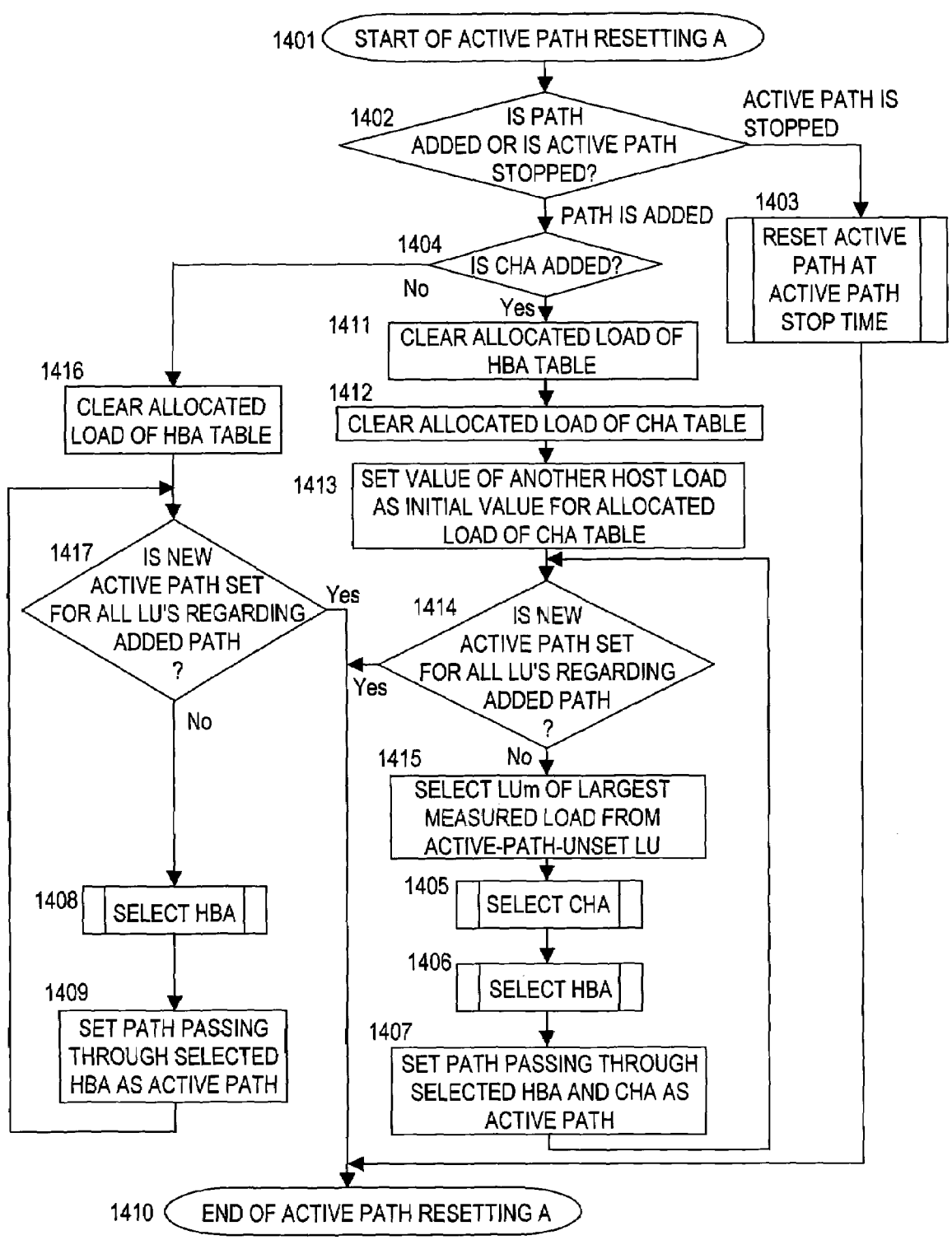
FIG. 14 is a flowchart of an active path resetting subprogram A according to the embodiment of this invention.

FIG. 14 is a flowchart of the active path resetting subprogram A 207 according to the embodiment of this invention.

In the step 908 of FIG. 9, execution of the active path resetting subprogram A 207 is started by the alternate path management program 203 calling the subprogram (1401).

First, the active path resetting subprogram A 207 determines whether a new usable path is added or the use of the active path is stopped (1402).

Figure 15:
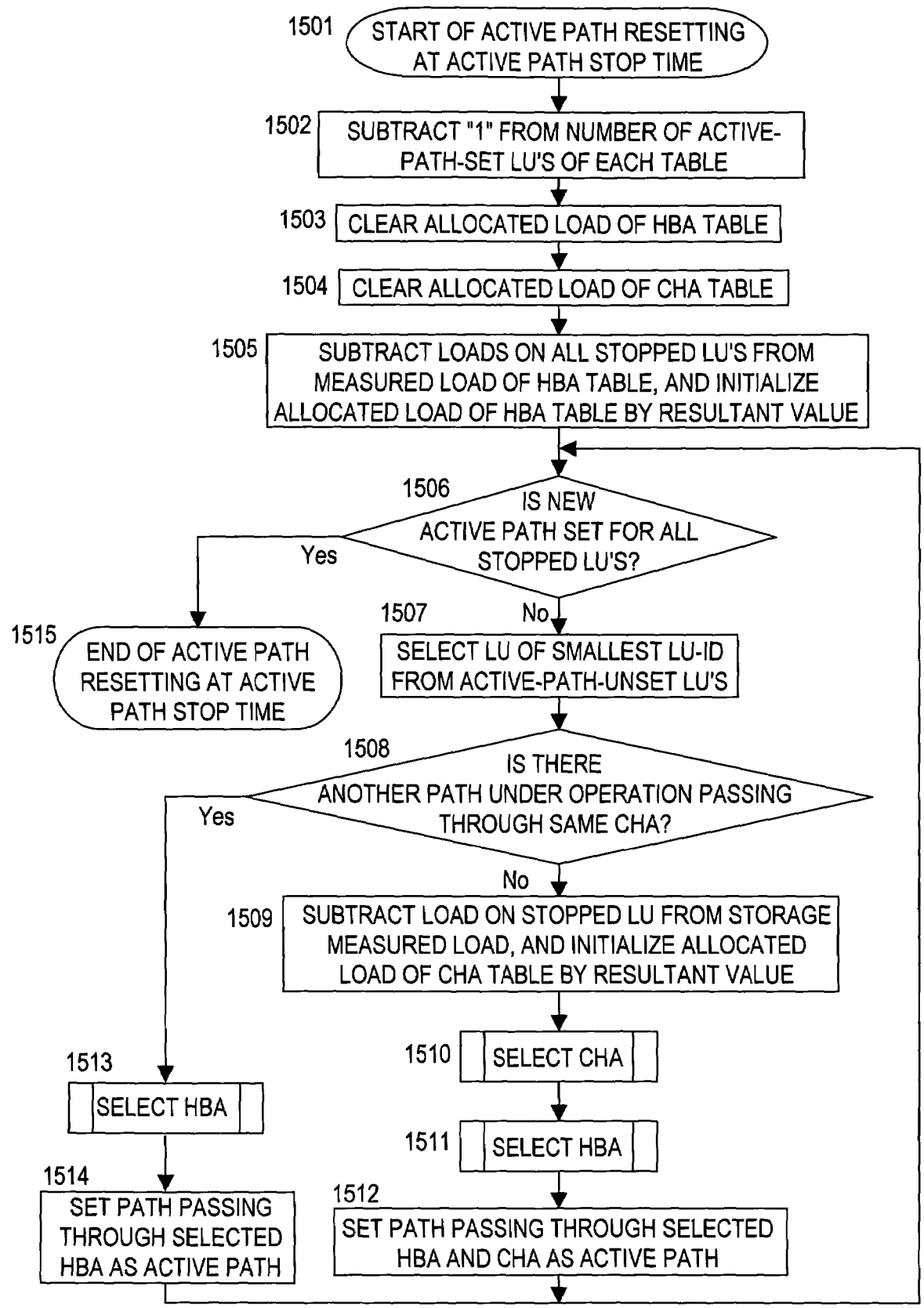
FIG. 15 is a flowchart of active path resetting processing at an active path stop time according to the embodiment of this invention.

If the stoppage of use of the active path is determined in the step 1402, an active path must be set in place of the stopped active path. As a result, access made through the stopped active path is allocated to another path. Thus, the active path resetting subprogram A 207 executes active path resetting processing at the time of the active path stoppage (1403). Referring to FIG. 15, this processing will be described later in detail.

Upon the completion of the processing of the step 1403, the processing of the active path resetting subprogram A 207 is completed (1410).

On the other hand, if the addition of the new usable path is determined in the step 1402, the active path resetting subprogram A 207 allocates the preset active path to the added path (i.e., the added path is set as an active path), thereby dispersing a load.

As described above, the addition of the new path means that a new device (HBA 105 or CHA 107) constituting a path is added. The addition of the new device includes not only a case where a new device is disposed but also a case where a device recovers from a failure. Thus, the active path resetting subprogram A 207 determines an addition of a new CHA 107 (1404).

If the addition of a new CHA 107 is determined in the step 1404, the active path resetting subprogram A 207 allocates an active path to the added CHA 107 to balance a load.

First, the active path resetting subprogram A 207 clears allocated loads 603 (i.e., sets values to "0") corresponding to all the HBA-ID's 601 in the HBA table 600 (1411).

Next, the active path resetting subprogram A 207 clears allocated loads 703 corresponding to all the CHA-ID's 701 in the CHA table 700 (1412).

Next, the active path resetting subprogram A 207 sets a value of another host load 804 calculated for each CHA 107 as an initial value in the allocated load 703 of the CHA table 700 (1413).

Next, the active path resetting subprogram A 207 determines whether a new active path has been set or not for all the LU's 109 regarding the added path (1414). Here, the LU 109 regarding the added path is the LU 109 connected to the added path among the LU's 109 which have been recognized by the host A, and, the LU 109 newly recognized by the host A based on the addition of the path.

If it is determined in the step 1414 that the new active path has been set for all the LU's 109 regarding the added path, the processing of the active path resetting subprogram A 207 is completed (1410).

On the other hand, if it is determined in the step 1414 that a new active path has not been set for all the LU's 109 regarding the added path (i.e., there is no new active path set for at least one LU 109), the active path resetting subprogram A 207 compares values of the measured loads 502 of the LU's 109 for which no active path has been set with one another, and selects the LU 109 (LUm) of a largest value (1415).

Figure 16:
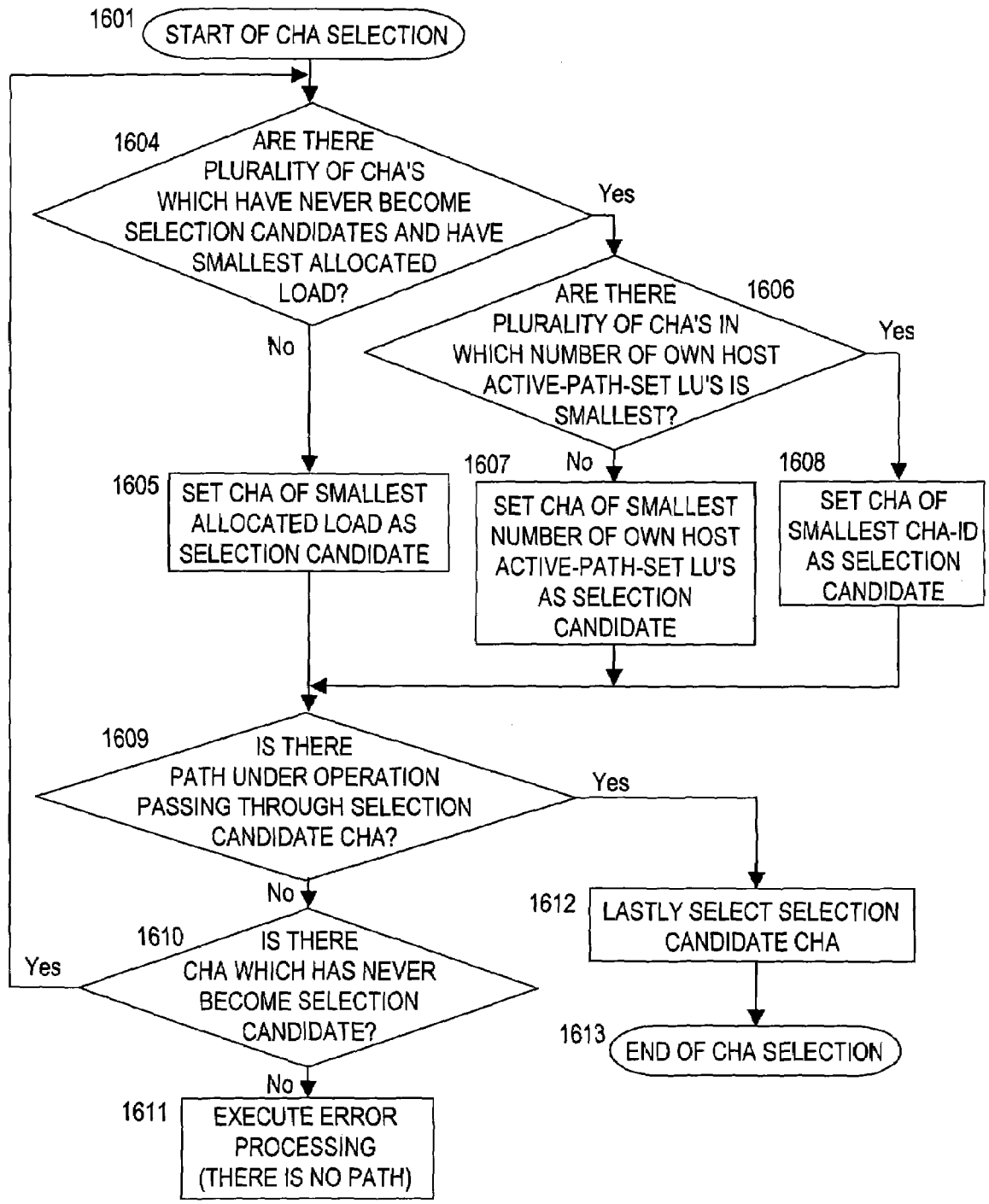
FIG. 16 is a flowchart of CHA selection processing according to the embodiment of this invention.
Figure 17:
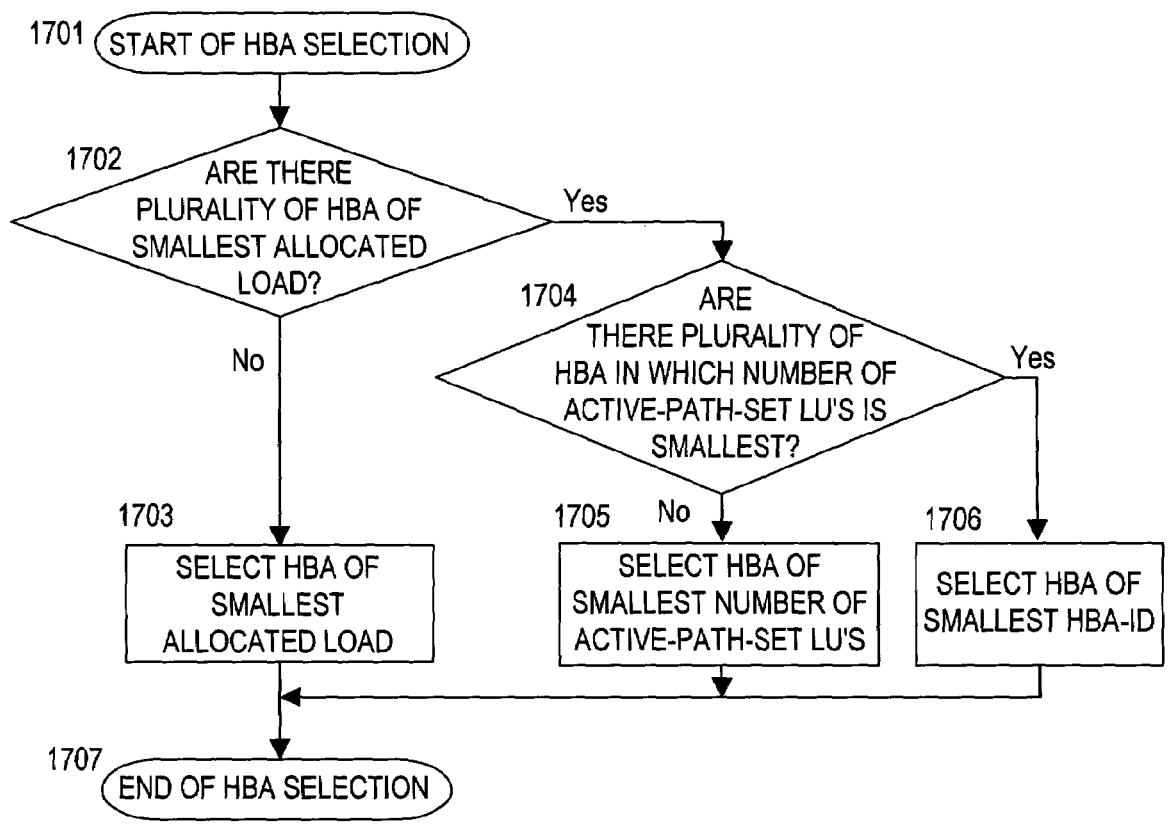
FIG. 17 is a flowchart of HBA selection processing according to the embodiment of this invention.

Next, the active path resetting subprogram A 207 sequentially executes the CHA selection processing (1405) and the HBA selection processing (1406). Referring to FIGS. 16 and 17, these operations will be described later in detail.

Next, the active path resetting subprogram A 207 sets a path passing through the HBA 105 and the CHA 107 selected in the steps 1405 and 1406 as a new active path (1407). Specific processing executed by the active path resetting subprogram A 207 in the step 1407 is similar to that executed for the "path A" in the step 1009 of FIG. 10, and thus detailed description thereof will be omitted. Here, the path passing through the selected HBA 105 and CHA 107 is equivalent to the "path A".

However, in the step 1407, reference is made to the measured load 502 of the LU table 500 of the host A in place of the average load. A value of the measured load 502 of the LU 109 reached by the path A is added to the allocated load 703 of the CHA table 700 corresponding to the path A and the allocated load 603 of the HBA table 600 corresponding to the path A.

If the LU 109 reached by the path A is newly recognized, there is no value of a measured load 502 since the LU 109 is not used by the host A. In this case, a value obtained by dividing a total value of the measured loads 502 of all the LU's 109 by the number of LU's 109 is added to the allocated load 703 and the allocated load 603.

Upon the completion of the processing of the step 1407, the process returns to the step 1414.

On the other hand, if it is determined in the step 1404 that a new CHA 107 has not been added, a new HBA 105 is added. In this case, a load is balanced by allocating an active path to the added HBA 105. However, the active path is not reset for the CHA 107. In other words, the active path resetting subprogram A 207 executes the HBA selection processing (1408) without executing the CHA selection processing. Referring to FIG. 17, this HBA selection processing will be described later in detail.

Before the execution of the HBA section processing (1408), the active path resetting subprogram A 207 clears the allocated loads 603 corresponding to all the HBA-ID's 601 (1416).

Next, the active path resetting subprogram A 207 determines whether a new active path has been set or not for all the LU's 109 regarding the added path (1417).

If it is determined in the step 1417 that a new active path has been set for all the LU's 109 regarding the added path, the processing of the active path resetting subprogram A 207 is completed (1410).

On the other hand, if it is determined in the step 1417 that a new active path has not been set for all the LU's 109 regarding the added path (i.e., there is no new active path set for at least one LU 109), the active path resetting subprogram A 207 executes the HBA selection processing (1408).

Next, the active path resetting subprogram A 207 sets a path passing through the HBA 105 selected in the step 1408 as a new active path (1409). Specific processing executed in the step 1409 is similar to that executed in the step 1407, and thus detailed description thereof will be omitted.

However, since an active path is not reset for the CHA 107, the setting of the active path regarding each CHA 107 is not changed. Thus, in the step 1409, the CHA table 700 is not changed.

Upon the completion of the processing of the step 1409, the process returns to the step 1417.

FIG. 15 is a flowchart of active path resetting processing at the active path stop time according to the embodiment of this invention.

As described above, if a failure occurs in the device (HBA 105 or CHA 107) constituting the active path, or if one of such devices is removed, the active path stops. The active path resetting processing at the active path stop time is processing for setting a new active path to replace the stopped active path.

The active path resetting processing at the active path stop time is executed by the active path resetting subprogram A 207 in the step 1403 of FIG. 14.

Upon a start of the active path resetting processing at the active path stop time (1501), the active path resetting subprogram A 207 first subtracts "1" from the values of the number 408 of active-path-set LU's, the number 604 of active-path-set LU's, and the number 704 of own host active-path-set LU's of the path table 400, the HBA table 600 and the CHA table 700 regarding the stopped path (1502).

Next, the active path resetting subprogram A 207 clears the allocated loads 603 (sets values to "0") corresponding to the all the HBA-ID 601 in the HBA table 600 (1503).

Next, the active path resetting subprogram A 207 clears the allocated loads 703 corresponding to all the CHA-ID's 701 in the CHA table 700 (1504).

Next, the active path resetting subprogram A 207 refers to the LU table 500 to subtract the measured loads 502 of all the LU's 109 regarding the stopped active path from the measured loads 602 of the HBA tale 600, and initializes the allocated loads 603 by the measured loads 602 after the subtraction (1505). In other words, the values of the measured loads 602 after the subtraction are copied to the allocated loads 603.

Next, the active path resetting subprogram A 207 determines whether a new active path has been set or not for all the LU's 109 regarding the stopped active path (1506).

If it is determined in the step 1506 that the new active path has been set for all the LU's 109, the active path resetting subprogram A 207 completes the active path resetting processing of the active path stop time (1515).

On the other hand, if it is determined in the step 1506 that a new active path has not been set for all the LU's 109, a new active path must be set for the LU's 109 for which no new active path has been set. Thus, the active path resetting subprogram A 207 selects one of a smallest LU-ID 501 from the LU's 109 for which no new active path has been set (1507).

Next, the active path resetting subprogram A 207 determines whether there is one or more paths under operation or not among other paths passing through the CHA 107 passed through by the stopped active path regarding the LU 109 selected in the step 1507 (1508).

If it is determined in the step 1508 that there is one or more paths under operation, since the CHA 107 constituting the stopped active path is under operation, one of the paths of the operative statuses passing through the CHA 107 can be set as a new active path in place of the stopped active path. Thus, the active path resetting subprogram A 207 executes the HBA selection processing (1513) without executing the CHA selection processing. Referring to FIG. 17, the HBA selection processing will be described later in detail.

Next, the active path resetting subprogram A 207 sets a path passing through the HBA 105 selected in the steps 1513 as a new active path (1514). Specific processing executed in the step 1514 is similar to that executed in the step 1409 of FIG. 14, and thus detailed description thereof will be omitted.

On the other hand, if it is determined in the step 1508 that there is no path under operation, the CHA 107 constituting the stopped active path cannot be set as a new active path. Accordingly, to set a new active path passing through another CHA 107, the active path resetting subprogram A 207 executes the CHA selection processing (1510) and the HBA selection processing (1511). Referring to FIGS. 16 and 17, the CHA selection processing and the HBA selection processing will be described later.

Before the execution of the CHA selection processing (1510) and the HBA section processing (1511), the active path resetting subprogram A 207 initializes the allocated loads 703 of the CHA table (1509). Specifically, the active path resetting subprogram A 207 obtains a storage measured load 802 for each CHA 107, and sets an allocated load 703 by using the obtained value as an initial value. At this time, for the CHA 107 passed through by the stopped path, a value obtained by subtracting the measured load 407 of the stopped path from the obtained storage measured load 802 is set as an initial value of the allocated load 703.

Next, the active path resetting subprogram A 207 sets a path passing through the CHA 107 and the HBA 105 selected in the steps 1510 and 1511 as a new active path (1512). Specific processing executed in the step 1512 is similar to that executed in the step 1407 of FIG. 14, and thus detailed description thereof will be omitted.

Upon the completion of the processing of the step 1512 or 1514, the process returns to the step 1506.

FIG. 16 is a flowchart of the CHA selection processing according to the embodiment of this invention.

The CHA selection processing of FIG. 16 is nearly similar to the initial CHA selection processing of FIG. 11. In other words, steps 1604 to 1613 of FIG. 16 correspond to the steps 1104 to 1113 of FIG. 11.

In the following, detailed description of portions similar to those of FIG. 11 will be omitted.

In the step 1405 of FIG. 14 or in the step 1510 of FIG. 15, the CHA selection processing is executed by the active path resetting subprogram A 207. In a step 1909 of FIG. 19, as described later, the CHA selection processing is also executed by the active path resetting subprogram B 208. When executing the CHA selection processing, the active path resetting subprogram A 207 or the like refers to the CHA table 700 and the load information table 800. A CHA 107 selected by this processing is set as a new active path.

Upon a start of the CHA selection processing (1601), the active path resetting subprogram A 207 or the like determines whether there are a plurality of CHA's 107 which have not become selection candidates and in which a value of an allocated load 703 is smallest or not among all the CHA's 107 (1604).

If it is determined in the step 1604 that there are not a plurality of CHA's 107 which have not become selection candidates and in which the value of the allocated load 703 is smallest, the active path resetting subprogram A 207 or the like sets a CHA 107 of a smallest value of the allocated load 703 as a selection candidate (1605).

On the other hand, if it is determined in the step 1604 that there are a plurality of CHA's 107 which have not become selection candidates and in which the value of the allocated load 703 is smallest, the active path resetting subprogram A 207 or the like determines whether there are a plurality of CHA's 107 in which the number 704 of own host active-path-set LU's is smallest or not among the plurality of CHA's 107 (1606).

If it is determined in the step 1606 that there are not a plurality of CHA's 107 in which the number 704 of own host active-path-set LU's is smallest, there is only one CHA 107 in which the value of the allocated load 703 is smallest and the number 704 of own host active-path-set LU's is smallest. The active path resetting subprogram A 207 or the like sets the CHA 107 as a selection candidate (1607).

On the other hand, if it is determined in the step 1606 that there are a plurality of CHA's 107 in which the number 704 of own host active-path-set LU's is smallest, the active path resetting subprogram A 207 or the like sets a CHA 107 of a smallest CHA-ID 701 as a selection candidate among the plurality of CHA's 107 (1608).

Upon the setting of the CHA 107 as the selection candidate in the step 1605, 1607 or 1608, the active path resetting subprogram A 207 or the like determines whether there is a path under operation passing through the CHA 107 as the selection candidate or not (1609).

If it is determined in the step 1609 that there is a path under operation passed through the CHA 107 as the selection candidate, the active path resetting subprogram A 207 or the like lastly selects the CHA 107 as the selection candidate (1612), and completes the CHA selection processing (1613). Subsequently, HBA selection processing is executed for all the paths for the processing target LU's of the operative statuses among the paths determined to be "present" in the step 1609, (refer to FIG. 17).

If it is determined in the step 1609 that there is no path under operation passing through the CHA 107 as the selection candidate, the active path resetting subprogram A 207 or the like removes the CHA 107 which is a selection candidate at this time from selection candidates. Then, determination is made as to whether there is a CHA 107 which has not become a selection candidate or not (1610).

If it is determined in the step 1610 that there is a CHA 107 which has not become a selection candidate, the process returns to the step 1604.

On the other hand, if it is determined in the step 1610 that there is no CHA 107 which has not become a selection candidate, error processing is executed (1611).

FIG. 17 is a flowchart of the HBA selection processing according to the embodiment of this invention.

In the step 1406 or 1408 of FIG. 14 or in the step 1511 or 1513 of FIG. 15, the HBA selection processing is executed by the active path resetting subprogram A 207. As described later, in the step 1910 of FIG. 19, the HBA selection processing is also executed by the active path resetting subprogram B 208. When executing the HBA selection processing, the active path resetting subprogram A 207 or the like refers to the HBA table 600. An HBA 105 selected by this processing is set as a new active path.

Upon a start of the HBA selection processing (1701), the active path resetting subprogram A 207 or the like first determines whether there are a plurality of HBA's 105 in which the allocated load 603 is smallest among target paths or not (1702).

Here, the target path is a path of an HBA selection processing target. If the HBA selection processing is executed in the step 1406, 1511 or 1910, among paths determined to be "present" in the step 1609 of the CHA selection processing of FIG. 16 executed immediately before this step, all the paths reaching the processing target LU 109 become targets. If the HBA selection processing is executed in the step 1408, among the paths passing through all the HBA 105 under operation, the paths under operation reaching the processing target LU 109 become targets. If the HBA selection processing is executed in the step 1513, among the paths passing through the CHA 107 constituting the stopped active path, all the paths under operation reaching the processing target LU 109 become targets.

If it is determined in the step 1702 that there are not a plurality of HBA's 105 in which the allocated load 603 is smallest, there is only one HBA 105 in which the allocated load 603 is smallest. To balance a load as uniformly as possible, an active path of the HBA 105 of a smallest allocated load 603 is preferably allocated. Thus, the active path resetting subprogram A 207 or the like selects the HBA 105 (1703).

On the other hand, if it is determined in the step 1702 that there are a plurality of HBA's 105 in which the allocated load 603 is smallest, the active path resetting subprogram A 207 or the like determines whether there is an HBA 105 of a smallest number 604 of active-path-set LU's among the plurality of HBA's 105 (1704).

If it is determined in the step 1704 that there are not a plurality of HBA's 105 of a smallest number 604 of active-path-set LU's, there is only one HBA 105 of a smallest number 604 of active-path-set LU's. To balance a load as uniformly as possible, the active path to the LUm is preferably allocated to the HBA 105 of the smallest number 604 of active-path-set LU's. Thus, the active path resetting subprogram A 207 or the like selects the HBA 105 (1705).

On the other hand, if it is determined in the step 1704 that there are a plurality of HBA's 105 of a smallest number 604 of active-path-set LU's, a load is similarly balanced whichever one of the plurality of HBA's 105 is selected. Accordingly, the active path resetting subprogram A 207 or the like selects an HBA 105 of a smallest HBA-ID 601 among the plurality of HBA's 105 (1706).

Thus, the HBA selection processing is completed (1707).

FIG. 18 is a flowchart of the active path resetting subprogram B 208 according to the embodiment of this invention.

In the step 910 of FIG. 9, execution of the active path resetting subprogram B 208 is started by the alternate path management program 203 calling the subprogram (1801).

First, the active path resetting subprogram B 208 determines whether a load on the active path has been balanced or not (1802). For example, minimum and maximum values of the measured loads on the all the HBA's 105 and all the CHA's 107 are compared to determine whether the minimum value is 90% or more of the maximum value. If a result shows that the minimum value is 90% or more of the maximum value, it is determined that the active path load is balanced, and the process proceeds to a step 1805 without resetting any active path.

On the other hand, if the minimum value is not 90% or more of the maximum value, it is determined that the active path load is not balanced. In this case, the process proceeds to a step 1803 to reset an active path, thereby balancing the load.

In the example, a threshold value to determine the balancing of the load is "90% of the maximum value of the measured load". However, the user may use other threshold values (e.g., 50% of the maximum value).

Next, the active path resetting subprogram B 208 executes active path resetting processing for all the LU's (1803). This processing will be described later in detail (refer to FIG. 19).

Next, the active path resetting subprogram B 208 copies a value of a path ID 504 of a new active path of the LU table 500 to a path ID 503 of a current active path (1804). As a result, an operation of the new active path is started.

Next, the values of the measured loads 407, 502, 602 and 702 of the path table 400, the LU table 500, the HBA table 600, and the CHA table 700 are cleared (1805). In other words, these values are set to "0".

Thus, the execution of the active path resetting subprogram B 208 is completed (1806).

FIG. 19 is a flowchart of the active path resetting processing for all the LU's according to the embodiment of this invention.

The active path resetting processing for all the LU's is executed by the active path resetting subprogram B 208 in the step 1803 of FIG. 18.

Upon a start of the active path resetting processing for all the LU's (1901), the active path resetting subprogram B 208 first obtains a storage measured load on each CHA 107 from the storage system 108 (1902). The procedure is similar to that of the step 1004 of FIG. 10.

Next, the active path resetting subprogram B 208 obtains another host load 804 (1903). Specifically, the active path resetting subprogram B 208 obtains a value obtained by subtracting an own host measured load 803 from the storage measured load 802 stored in the load information table 800 as another host load 804.

Next, the active path resetting subprogram B 208 clears the number 604 of active-path-set LU's of the HBA table 600 and the number 704 of own host active-path-set LU's of the CHA table 700 (1904). Specifically, the values are set to "0".

Next, the active path resetting subprogram B 208 clears allocated loads 603 corresponding to all the HBA-ID's 601 in the HBA table 600. Further, the active path resetting subprogram B 208 clears allocated loads 703 corresponding to all the CHA-ID's 701 in the CHA table 700 (1913).

Next, the active path resetting subprogram B 208 sets a value of another host load 804 calculated for each CHA 107 in the allocated load 703 of the CHA table 700 (1914).

Next, the active path resetting subprogram B 208 determines whether new active paths have been set or not for all the LU's (1905).

If it is determined in the step 1905 that active paths have been set for all the LU's, the active path resetting subprogram B 208 completes the active path resetting processing for all the LU's (1912).

On the other hand, in the step 1905, if it is determined that new active paths have not been set for all the LU's 109 (a new active path has not been set for at least one LU 109), the active path resetting subprogram B 208 compares values of measured loads 502 of the LU's 109 for which no new active path has been set, and selects the LU 109 of a largest value (1906). Hereinafter, the LU 109 selected in the step 1906 will be referred to as an LUm.

Next, the active path resetting subprogram B 208 determines whether there is only one usable (i.e., no failure) path for the LUm or not (1907).

If it is determined in the step 1907 that there is only one usable path, the active path resetting subprogram B 208 sets the usable path as a new active path to the LUm (1908).

On the other hand, if it is determined in the step 1907 that the number of usable paths is not one (i.e., a plurality of paths are present), the active path resetting subprogram B 208 sequentially executes the CHA selection processing (1909) and the HBA selection processing (1910) to select the CHA 107 and the HBA 105 for which an active path has been set from the paths.

Next, the active path resetting subprogram B 208 sets the path determined in the step 1908 or the path passing through the CHA 107 and the HBA 105 selected in the steps 1909 and 1910 as a new active path (1911). Specific processing executed in the step 1911 is similar to that executed in the step 1407 of FIG. 14, and thus detailed description thereof will be omitted. However, if the step 1911 is executed after the step 1908, the path decided in the step 1908 is equivalent to the "path A".

Upon the completion of the processing of the step 1911, the process returns to the step 1905.

The processing executed by each program of the embodiment of this invention has been described.

Next, a specific example of processing executed by each program of the embodiment of this invention will be described with reference to the drawings.

Here, an example where an operation of the host A of FIG. 1 is first started, subsequently an operation of the host B is started will be described.

As described above with reference to FIGS. 1 and 4, 24 usable paths are set between the host A and the LU's 109, and 24 usable paths are also set between the host B the LU's 109.

No access is made when neither the host A nor B is started. In this case, an active path is not set.

First, the host A is started.

Upon the start of the OS of the host A, execution of the alternate path management program 203 is started (901), and the initial active path setting subprogram 206 is executed.

The initial active path setting subprogram 206 creates each table (1002, and 1003), and obtains a storage measured load 802 (1004). At this time, the storage system 108 has not been accessed from any one of the host 101, and thus a value of the storage measured load 802 is "0". A value (initial value) of each table at this time is as described above with reference to FIG. 10.

At this time, active paths have not been set for all the LU's 109 (1005), an LU 1 whose LU-ID 501 is smallest is selected (1006), and initial CHA selection processing is executed (1007).

At this time, storage measured loads 802 are "0" in all the CHA's 107 (1102), and the number 704 of own host active-path-set LU's is "0" in all the CHA's 107 (1106). Thus, the CHA 1 of a smallest CHA-ID 701 becomes a selection candidate (1108).

There is a path under operation passing through the CHA 1 (1109). Thus, the CHA 1 as a selection candidate is lastly selected (1112), and the initial CHA selection processing is completed (1113). Next, initial HBA selection processing is executed by using the path under operation passing through the CHA 1 to the LU 1 as a target (1008).

At this time, the number of active-path-set LU's 604 is "0" in all the HBA's 105 (1202). Thus, the HBA 1 of a smallest HBA-ID 601 is selected (1204), and the initial HBA selection processing is completed (1205).

As a result, the path passing through the selected HBA 1 and CHA 1 is set as an active path for the LU 1 (1009). In other words, a path ID of this active path is "111". At this time, the path whose path number 401 is "1" of the path table 400 corresponds to the path ID "111". Thus, for the path whose path number 401 is "1", the active information 403 is updated to "Yes", and the number 408 of active-path-set LU's is updated to "1".

Further, in the LU table 500, the path ID 504 of the new active path corresponding to the LU 1 is updated to "111". In the HBA table 600, the number 604 of active-path-set LU's corresponding to the HBA 1 is updated to "1". In the CHA table 700, the number 704 of own host active-path-set LU's corresponding to the CHA 1 is updated to "1" (1009).

Similarly, for the LU 2 to the LU 4, initial CHA selection processing and initial HBA processing are sequentially executed, and active paths are set (1005 to 1009).

For the LU 2, the number 704 of active-path-set LU's is smallest, i.e., "0", in the CHA 2 and the CHA 3 (1106), and thus the CHA 2 of a smallest CHA-ID is selected (1108, and 1112). On the other hand, there is only the HBA 2 whose number 604 of active-path-set LU's is smallest, i.e., "0" (1202), and thus the HBA 2 is selected (1203).

As a result, the path passing through the HBA 2 and the CHA 2 to reach the LU 2 is set as an active path (1009), and its path ID is "222".

Accordingly, the active information 403 and the number 408 of active-path-set LU's corresponding to the path ID "222" are respectively updated to "Yes" and "1". Further, the path ID 504 of the new active path corresponding to the LU 2 is updated to "222", the number 604 of active-path-set LU's corresponding to the HBA 2 is updated to "1", and the number 704 of own host active-path-set LU's corresponding to the CHA 2 is updated to "1" (1009).

For the LU 3, the number 704 of own host active-path-set LU's of only the CHA 3 is smallest, i.e., "0" (1106), and thus the CHA 3 is selected (1107, and 1112). On the other hand, since the number 604 of active-path-set LU's of the HBA 1 and the HBA 2 is smallest, i.e., "1" (1202), the HBA 1 of a smallest HBA-ID 601 is selected (1204).

As a result, the path passing through the HBA 1 and the CHA 3 to reach the LU 3 is set as an active path (1009), and its path ID is "133".

Accordingly, the active information 403 and the number 408 of active-path-set LU's corresponding to the path ID "133" are respectively updated to "Yes" and "1". Further, the path ID 504 of the new active path corresponding to the LU 3 is updated to "133", the number 604 of active-path-set LU's corresponding to the HBA 1 is updated to "2", and the number 704 of own host active-path-set LU's corresponding to the CHA 3 is updated to "1" (1009).

For the LU 4, the number 704 of own host active-path-set LU's of the CHA 1 to CHA 3 is smallest, i.e., "1" (1106), and thus the CHA 1 of the smallest CHA-ID is selected (1108, and 1112). On the other hand, since the number 604 of active-path-set LU's of only the HBA 2 is smallest, i.e., "1" (1202), the HBA 2 is selected (1203).

As a result, the path passing through the HBA 2 and the CHA 1 to reach the LU 4 is set as an active path (1009), and its path ID is "214".

Accordingly, the active information 403 and the number 408 of active-path-set LU's corresponding to the path ID "214" are respectively updated to "Yes" and "1". Further, the path ID 504 of the new active path corresponding to the LU 4 is updated to "214", the number 604 of active-path-set LU's corresponding to the HBA 2 is updated to "2", and the number 704 of own host active-path-set LU's corresponding to the CHA 1 is updated to "2" (1009).

With the above processing, the active path is set for all the LU's 109 (1005). Hence, the value of the new active path ID 504 of the LU table 500 is copied to the current path ID 503 (1010).

Accordingly, the execution of the initial active path setting subprogram 206 is completed (1011). Thereafter, the set active path is operated.

Figure 20:
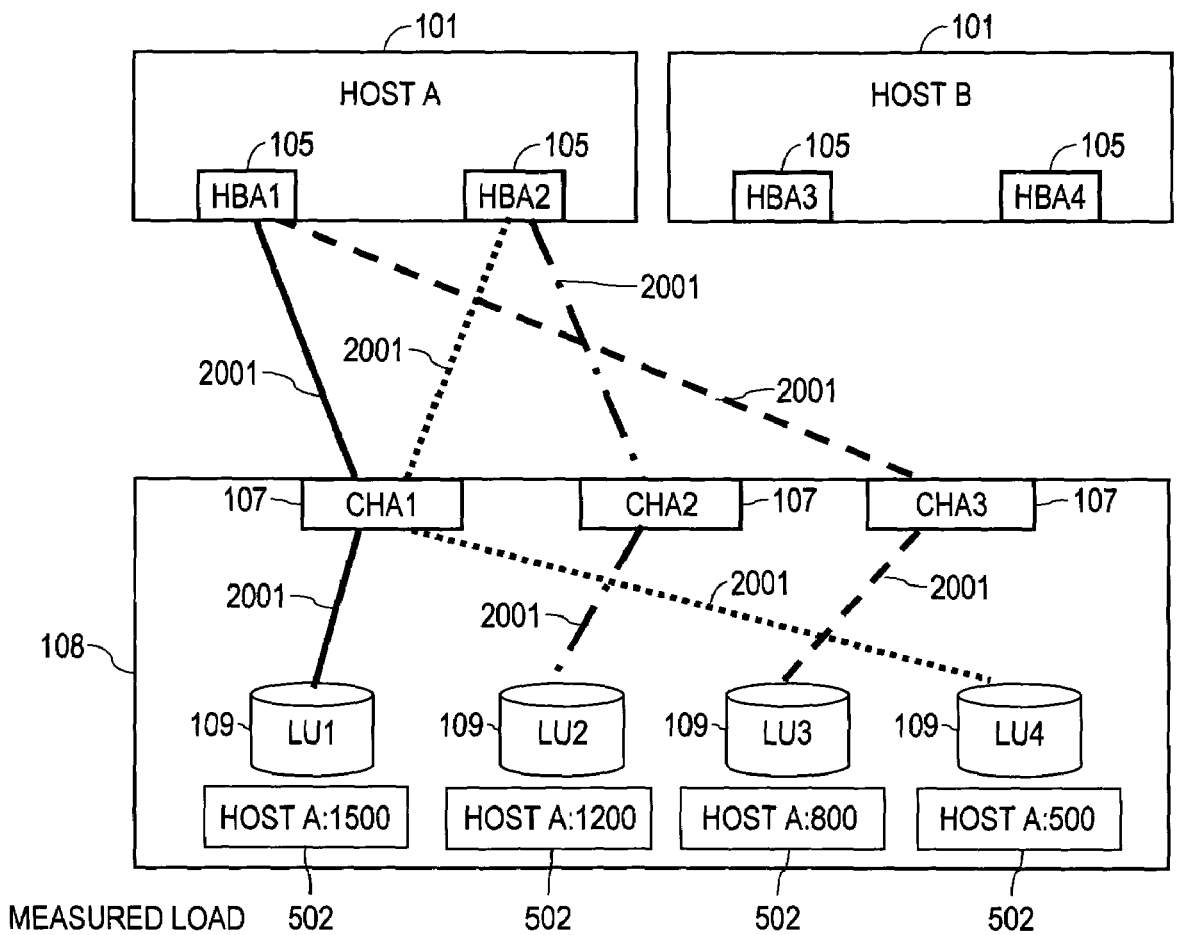
FIG. 20 is an explanatory diagram of an initial active path set in a host A in the computer system of the embodiment of this invention.

FIG. 20 is an explanatory diagram of an initial active path set in the host A in the computer system according to the embodiment of this invention.

FIG. 20 shows a case where execution of the initial active path setting subprogram 206 is completed in the host A, the host A is operated, and an I/O occurs in a set active path 2001. At this time, the host B is not operated.

In FIG. 20, for explanation, detailed configuration of units other than the HBA 105, the CHA 107, and the LU 109 is omitted.

As described above, the active path 2001 reaching the LU 1 from the host A passes through the HBA 1 and the CHA 1. The active path 2001 reaching the LU 2 from the host A passes through the HBA 2 and the CHA 2. The active path 2001 reaching the LU 3 from the host A passes through the HBA 1 and the CHA 3. The active path 2001 reaching the LU 4 from the host A passes through the HBA 2 and the CHA 1.

A measured load 502 of FIG. 20 is a load imposed by an I/O for each LU 109. FIG. 20 shows a measured load 502 for each LU 109. In reality, however, the measured load 502 is measured by the host load measuring subprogram 204 of the host A, and stored in the LU table 500 of the host A.

In the example of FIG. 20, the measured loads 502 of the LU's 1 to 4 are respectively "1500", "1200", "800" and "500". Each of these values is, e.g., the number of I/O's made in a predetermined time period. However, it may be an I/O data amount, a CPU usage rate, or the like. Contents of the LU table at the time shown in FIG. 20 are as shown in FIG. 5.

The CHA 1 is set as the active path 2001 to the LU's 1 and 4. Thus, a measured load 702 of the CHA 1 is a total value "2000" of "1500" and "500". Similarly, measured loads 702 of the CHA's 2 and 3 are respectively "1200" and "800". Contents of the CHA table 700 at this time are as shown in FIG. 7.

The HBA 1 is set as the active path 2001 to the LU's 1 and 3. Thus, a measured load 602 of the HBA 1 is a total value "2300" of "1500" and "800". Similarly, a measured loads 602 of the HBA 2 is "1700" of "1200" and "500". Contents of the HBA table 600 at this time are as shown in FIG. 6.

Next, the host B is started.

An active path 2001 and a measured load 502 of the host A are as shown in FIG. 20 at the time of starting the host B.

Upon the start of the OS of the host B, execution of the alternate path management program 203 of the host B is started (901), and the initial active path setting subprogram 206 of the host B is executed.

The initial active path setting subprogram 206 creates each table (1002, and 1003). A value (initial value) of each table at this time is as described above with reference to FIG. 10. Next, a storage measured load 802 is obtained (1004). At this time, the storage system 108 has been accessed from the host A, and thus a value of the storage measured load 802 is as shown in FIG. 21.

FIG. 21 is an explanatory diagram of a load information table 800 of the host B at the time of starting the host B according to the embodiment of this invention.

Referring to FIGS. 20 and 7, at this time, each CHA 107 has been accessed only from the host A. Thus, storage measured loads 802 of the CHA's 2 and 3 are respectively "2000", "1200" and "800", similar to the measured loads 702 of the measured loads 700 of the host A.

On the other hand, the host B has not made any I/O at the time of being started. Thus, own host measured loads 803 are "0".

After all, the storage measured loads 802 are all imposed by the host A. Thus, other host loads 804 become equal to the storage measured loads 802.

The initial active path setting subprogram 206 proceeds to a step 1005 after acquisition of the storage measured load 802 (1004). At this time, since there is no active path set for any one of the LU's 109 (1005), the LU 1 of a smallest LU-ID 501 is selected (1006), and initial CHA selection processing is executed (1007).

The storage measured load 802 is not "0" (1102). Accordingly, in the CHA table 700 of the host B, initial values of the CHA's 1 to 3 are respectively set to "2000", "1200", and "800" (1103).

At this time, any one of all the CHA's 107 has not become a selection candidate in the initial CHA selection processing, and the allocated load 703 alone of the CHA 3 is minimum, i.e., "800" (1104). Thus, the CHA 3 becomes a selection candidate (1105).

There is a path under operation passed through the CHA 3 (1109). Accordingly, the CHA 3 is lastly selected (1112), and the initial CHA selection processing is completed (1113).

Next, initial HBA selection processing is executed by using the path under operation passed through the CHA 3 to reach the LU 1 as a target (1008).

At this time, the number 604 of active-path-set LU's 604 is "0" for all the HBA's 105 (1202), the HBA 3 of a smallest HBA-ID 601 is selected (1204), and the initial HBA selection processing is completed (1205).

As a result, the path passing through the selected HBA 3 and CHA 3 is set as an active path for the LU 1 (1009). A path ID of this active path is "331".

Thus, in the path table 400 of the host B of FIG. 22, active information corresponding to the path ID "331" is updated to "Yes", and the number 408 of active-path-set LU's is updated to "1".

Further, a path ID 504 of a new active path corresponding to the LU 1 is updated to "331" in the LU table of the host B of FIG. 23, the number 604 of active-path-set LU's corresponding to the HBA 3 is updated to "1" in the HBA table 600 of FIG. 24, and the number 704 of own host active-path-set LU's corresponding to the CHA 3 is updated to "1" in the CHA table 700 of FIG. 25 (1009).

A value (average load) "1000" obtained by dividing a total value "4000" of storage measured loads 802 by the number "4" of LU's 109 is added to the allocated load 703 "800" corresponding to the CHA 3. As a result, the allocated load 703 corresponding to the CHA 3 becomes "1800".

Similarly, for the LU 2 to the LU 4, the initial CHA selection processing and the initial HBA selection processing are sequentially executed, and an active path is set (1005 to 1009).

For the LU 2, among the CHA's 1 to 3, the CHA 2 of a smallest allocated load 703 "1200" is selected (1104, 1105, and 1112). On the other hand, since the number 604 of active-path-set LU's alone of the HBA 4 is minimum, "0" (1202), the HBA 4 is selected (1203).

As a result, the path passing through the HBA 4 and the CHA 2 to reach the LU2 is set as an active path (1009), and its path ID is "422".

Thus, active information 403 and the number 408 of active-path-set LU's 408 corresponding to the path ID "422" are respectively set to "Yes" and "1". Further, a path ID 504 of a new active path corresponding to the LU 2 is updated to "422", the number 604 of active-path-set LU's corresponding to the HBA 4 is updated to "1", and the number 704 of own host active-path-set LU's corresponding to the CHA 2 is updated to "1" (1009).

Further, the average load "1000" is added to "1200" to set the allocated load 703 corresponding to the CHA 2 to "2200".

For the LU 3, among the CHA's 1 to 3, the CHA 3 of a smallest allocated load 703 "1800" is selected (1104, 1105, and 1112). On the other hand, since the number 604 of active-path-set LU's of the HBA's 3 and 4 is minimum, i.e., "1" (1202), the HBA 3 of a smallest HBA-ID is selected (1203).

As a result, the path passing through the HBA 3 and the CHA 3 to reach the LU 3 is selected as an active path (1009), and its path ID is "333".

Accordingly, active information 403 and the number 408 of active-path-set LU's corresponding to the path ID "333" are respectively updated to "Yes" and "1". Further, a path ID 504 of a new active path corresponding to the LU 3 is updated to "333", the number 604 of active-path-set LU's corresponding to the HBA 3 is updated to "2", and the number 704 of own host active-path-set LU's 704 corresponding to the CHA 3 is updated to "2" (1009).

Further, the average load "1000" is added to "1800" to set the allocated load 703 corresponding to the CHA 3 to "2800".

For the LU 4, among the CHA's 1 to 3, the CHA 1 of a smallest allocated load 703 "2000" is selected (1104, 1105, and 1112). On the other hand, since the number 604 of active-path-set LU's of only the HBA 4 is minimum, i.e., "1" (1202), the HBA 4 of a smallest HBA-ID is selected (1203).

As a result, the path passing through the HBA 4 and the CHA 1 to reach the LU 4 is selected as an active path (1009), and its path ID is "414".

Accordingly, active information 403 and the number 408 of active-path-set LU's corresponding to the path ID "414" are respectively updated to "Yes" and "1". Further, a path ID 504 of a new active path corresponding to the LU 4 is updated to "414", the number 604 of active-path-set LU's corresponding to the HBA 4 is updated to "2", and the number 704 of own host active-path-set LU's corresponding to the CHA 1 is updated to "1" (1009).

Further, the average load "1000" is added to "2000" to set the allocated load 703 corresponding to the CHA 1 to "3000".

The active path has been set for all the LU's 109 (1005). Thus, a value of the path ID 504 of the new active path of the LU table 500 is copied to a path ID 503 of a current active path (1010).

Contents of each table of the host B at this time are shown in FIGS. 22 to 25. Description of portions of FIGS. 22 to 25 similar to those of FIGS. 4 to 7 will be omitted.

FIG. 22 is an explanatory diagram of the path table 400 of the host B according to the embodiment of this invention.

As described above, path ID's of the active paths 2001 reaching the LU's 1 to 4 from the host B are respectively "331", "422", "333", and "414". Thus, active information 403 and the number 408 of active-path-set LU's corresponding to these path ID's are respectively "Yes" and "1".

FIG. 23 is an explanatory diagram of the LU table 500 of the host B according to the embodiment of this invention.

As described above, the path ID's 504 of the new active paths reaching the LU's 1 to 4 from the host B are respectively "331", "422", "333", and "414". A value of the path ID 504 of the new active path is copied to the path ID 503 of the current active path ID 503. The path ID 504 of the new active path is copied to the path ID 503 of the current active path, and then cleared, FIG. 24 is an explanatory diagram of the HBA table 600 of the host B according to the embodiment of this invention.

The HBA 3 is set as an active path 2001 to the LU's 1 and 3. Thus, the number 604 of active-path-set LU's of the HBA 3 is "2".

The HBA 4 is set as an active path 2001 to the LU's 2 and 4. Thus, the number 604 of active-path-set LU's of the HBA 4 is "2".

FIG. 25 is an explanatory diagram of the CHA table 700 of the host B according to the embodiment of this invention.

The CHA 1 is set as an active path 2001 to the LU 4 by the host B. Thus, the number 704 of own host active-path-set LU's of the CHA 1 is "1". An allocated load 703 of the CHA 1 is "3000" which is a total value of a storage measured load 802 "2000", and an average load "1000".

The CHA 2 is set as an active path 2001 to the LU 2 by the host B. Thus, the number 704 of own host active-path-set LU's of the CHA 2 is "1". An allocated load 703 of the CHA 2 is "2200" which is a total value of a storage measured load 802 "1200", and an average load "1000".

The CHA 3 is set as an active path 2001 to the LU's 1 and 3 by the host B. Thus, the number 704 of own host active-path-set LU's of the CHA 3 is "2". An allocated load 703 of the CHA 1 is "2800" which is a total value of a storage measured load 802 "800", an average load "1000", and an average load "1000".

Thus, the execution of the initial active path setting subprogram 206 of the host B is completed (1011). Thereafter, the set active path is operated.

According to the embodiment, the storage system 108 measures a load (storage measured load 802) imposed by access from the host 101. When the host 101 is started to set an initial active path, if the operation of the other host 101 has been started, reference is made to the storage measured load 802 (i.e., another host load 804) in steps 1102 and 1103 of FIG. 11. Then, an active path is set to uniformly balance the load imposed by the access from all the hosts 101 (steps 1104 and 1105).

FIG. 26 is an explanatory diagram of effects of the initial active path setting processing according to the embodiment of this invention.

Referring to FIG. 26, specifically, in the initial active path setting subprogram 206, an initial active path set when reference is made to the storage measured load 802 (this embodiment) is compared with an initial active path set when no reference is made.

In FIG. 26, a path ID 2601 of the set initial active path indicates a path ID of an initial active path of the host B set after setting of an initial active path of the host A and start of an operation of the host A.

A line 2602 indicates a path ID 2701 of an active path set without reference to the storage measured load 802 (i.e., set without executing the step 1103 of FIG. 11). Detailed description will be omitted, but it should be noted in this case that path ID's of initial active paths of the host B set for the LU's 1 to 4 are respectively "311", "422", "333", and "414".

On the other hand, a line 2603 indicates a path ID 2701 of an active path set by referring to the storage measured load 802 (i.e., set by executing the step 1103 of FIG. 11). A line 2703 corresponds to the embodiment. According to the embodiment, as indicated by a path ID 503 of a current active path of FIG. 23, path ID's of initial active paths of the host B set for the LU's 1 to 4 are respectively "331", "422", "333", and "414".

Comparison of the lines 2602 and 2603 shows a difference only in initial active paths to the LU 1. As a result, when reference is not made to the storage measured load 802 (line 2602), the CHA 1 is set as initial active paths to the LU's 1 and 4. On the other hand, when reference is made to the storage measured load 802 (line 2603), the CHA 1 is set only as an initial active path to the LU 4.

As shown in FIGS. 20 and 21, two active paths are set in the CHA 1 by the host A, resulting in centralized loads. According to the embodiment, the host B sets an initial active path by avoiding the load-centralized CHA 1. As a result, the load is balanced in the entire system.

Next, a case where the active path resetting subprogram B 208 of FIG. 18 is executed in the host A after setting of initial active paths in the hosts A and B will be described.

Figure 27:
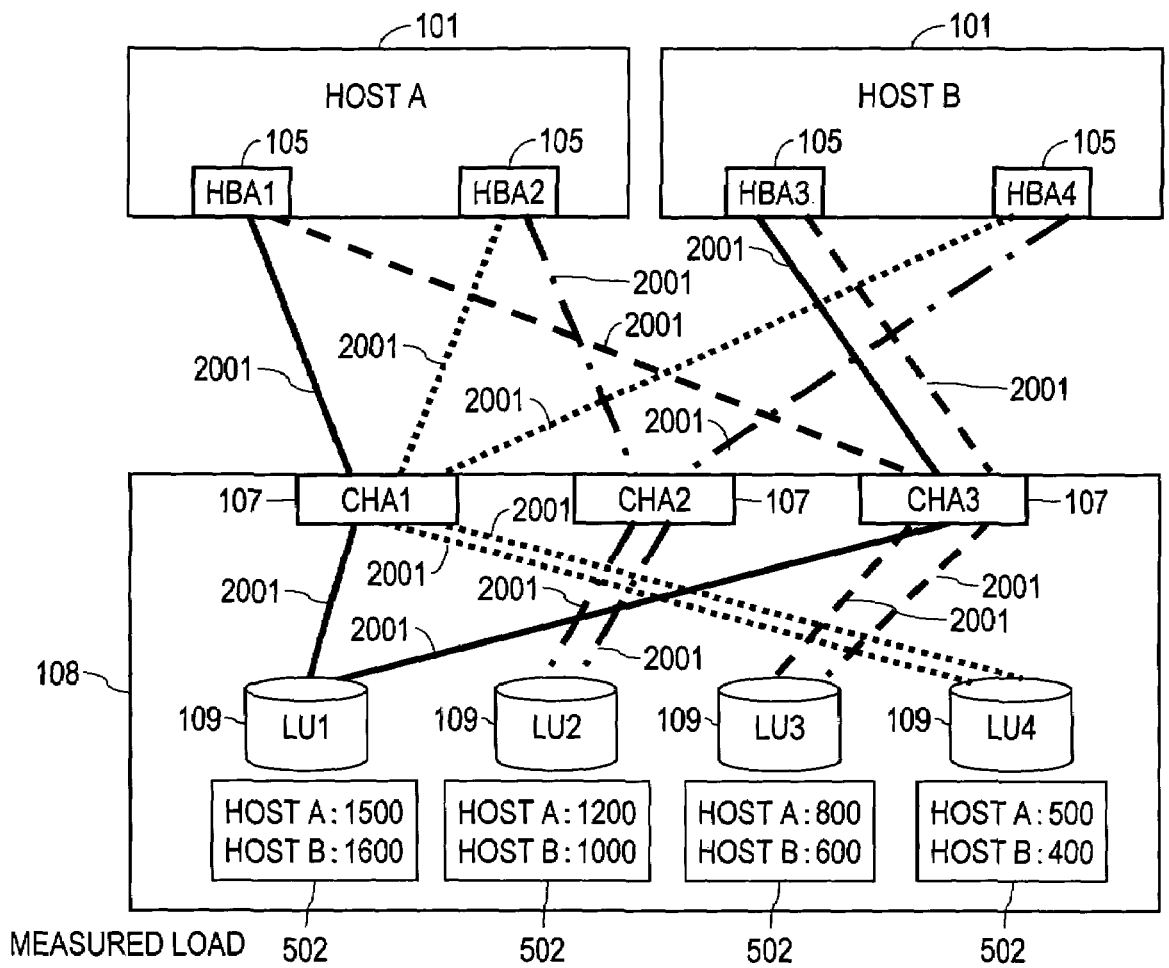
FIG. 27 is an explanatory diagram of a status where an initial active path is set in the host B in the computer system of the embodiment of this invention.

FIG. 27 is an explanatory diagram of a case where an initial active path is set in the host B in the computer system according to the embodiment of this invention.

FIG. 27 shows a case where after a start of an operation of the host A, the execution of the initial active path setting subprogram 206 is completed in the host B, and then the host B is started, and an I/O occurs in the set active path 2001.

As described above, the active path 2001 reaching the LU 1 from the host B passes through the HBA 3 and the CHA 3. The active path 2001 reaching the LU 2 from the host B passes through the HBA 4 and the CHA 2. The active path 2001 reaching the LU 3 from the host B passes through the HBA 3 and the CHA 3. The active path 2001 reaching the LU 4 from the host B passes through the HBA 4 and the CHA 1.

Measured loads 502 of FIG. 27 are loads imposed by I/O's made from the hosts A and B to the LU's 109. In FIG. 27, the measured load 502 is shown for each LU 109. In reality, however, the measured load 502 is measured by the host load measuring subprogram 204 of the hosts A and B, and stored in the LU table 500 of the hosts A and B.

In the example of FIG. 27, measured loads 502 of the LU's 1 to 4 measured by the host A are respectively "1500", "1200", "800", and "500". Measured loads 502 of the LU's 1 to 4 measured by the host B are respectively "1600", "1000", "600", and "400".

At this time, a storage measured load 802 of the CHA 1 is "2400" which is a total value of the measured load 502 "1500" from the host A to the LU 1, the measured load 502 "500" from the host A to the LU 4, and the measured load 502 "400" from the host B to the LU 4.

Similarly, a storage measured load 802 of the CHA 2 is "2200" which is a total value of the measured load 502 "1200" from the host A to the LU 2, and the measured load 502 "1000" from the host B to the LU 2. A storage measured load 802 of the CHA 3 is "3000" which is a total value of the measured load 502 "800" from the host A to the LU 3, the measured load 502 "1600" from the host B to the LU 1, and the measured load 502 "600" from the host B to the LU 3.

In this status, in the host A, execution of the active path resetting subprogram B 208 of FIG. 18 is started.

In FIG. 27, the load "3000" of the CHA 3 is largest, and the load "2200" of the CHA 2 is smallest. Here, since "2200" is smaller than a value "2700" which is 90% of "3000" (1802), active path resetting processing for all the LU's of FIG. 19 is executed (1803).

First, for the CHA's 1 to 3, own host measured loads 803 "2000", "1200", and "800" are subtracted from the storage measured loads 802 "2400", "2200", and "3000" to obtain other host loads 804 "400", "1000", and "2200" (1902 and 1903).

A load information table 800 of the host A at this time is as shown in FIG. 8.

Next, in the HBA table 600 and the CHA table 700, the number 604 of active-path-set LU's and the number 704 of own host active-path-set LU's are set to "0" (1904). Further, in the HBA table 600 and the CHA table 700, the allocated loads 603 and 703 are set to "0" (1913).

Next, as initial values of the allocated loads 703 corresponding to the CHA's 1 to 3, other host loads 804 "400", "1000", and "2000" obtained in the step 1903 are respectively set (1914).

At this time, there is no active path set (reset) for each LU 109 (1905). Thus, the LU 1 of a largest measured load 502 "1500" by the host A is selected (1906).

There are a plurality of usable paths for the LU 1 (1907). Thus, CHA selection processing of FIG. 16 is executed (1909).

At this time, all the CHA's 107 have not become selection candidates in the CHA selection processing, and the allocated load 703 alone of the CHA 1 is minimum, i.e., "400" (1604). Accordingly, the CHA 1 is set as a selection candidate (1605).

As there is a path under operation passed through the CHA 1 (1609), the CHA 1 is lastly selected (1612), and the CHA selection processing is completed (1613).

Next, HBA selection processing (FIG. 17) is executed by using the path under operation passed through the CHA 1 to reach the LU 1 as a target (1910).

At this time, the allocated loads 603 of the HBA's 1 and 2 and the number 604 of active-path-set LU's are minimum, i.e., "0" (1702 and 1704). Thus, the HBA 1 of a smallest HBA-ID 601 is selected (1706), and the HBA selection processing is completed (1707).

As a result, the path passing through the selected HBA 1 and CHA 1 is set as an active path for the LU 1 (1911). A path ID of this active path is "111".

Thus, in the path table 400 of the host A, active information 403 and the number 408 of active-path-set LU's corresponding to the path ID "111" are respectively updated to "Yes" and "1".

Further, in the LU table 500 of the host A, a path ID 504 of a new active path corresponding to the LU 1 is updated to "111".

In the HBA table 600, the number 604 of active-path-set LU's corresponding to the HBA 1 is updated to "1". The measured load 502 "1500" of the LU 1 is added to the allocated load 603 "0" corresponding to the HBA 1 to set the allocated load 603 to "1500".

In the CHA table 700, the number 704 of own host active-path-set LU's corresponding to the CHA 1 is updated to "1". The measured load 502 "1500" is added to the allocated load 703 "400" corresponding to the CHA 1 to set the allocated load 703 to "1900" (1911).

Similarly, for the LU's 2 to 4, CHA selection processing and HBA selection processing are executed in order from the largest measured load 502, and active paths are set (1905 to 1911).

For the LU 2, among the CHA's 1 to 3, the CHA 2 of a smallest allocated load 703 "1000" is selected (1604, 1605, and 1612). On the other hand, since the allocated load 603 alone of the HBA 2 is minimum, i.e., "0" (1702), the HBA 2 is selected (1703).

As a result, the path passing through the HBA 2 and the CHA 2 to reach the LU 2 is set as an active path (1911), and its path ID is "222".

Accordingly, active information 403 and the number 408 of active-path-set LU's corresponding to the path ID "222" are respectively updated to "Yes" and "1". A path ID 504 of a new active path corresponding to the LU 2 is updated to "222". The number 604 of active-path-set LU's corresponding to the HBA 2 is updated to "1". An allocated load 603 "0" corresponding to the HBA 2 is updated to a value "1200" obtained by adding the measured load 502 "1200" of the LU 2. The number 704 of own host active-path-set LU's corresponding to the CHA 2 is updated to "1". An allocated load 703 "1000" corresponding to the CHA 2 is updated to a value "2200" obtained by adding the measured load 502 "1200" of the LU 2 (1911).

For the LU 3, among the CHA's 1 to 3, the CHA 1 of a smallest allocated load 703 "1900" is selected (1604, 1605, and 1612). On the other hand, since the allocated load 603 alone of the HBA 2 is minimum, i.e., "1200" (1702), the HBA 2 is selected (1703).

As a result, the path passing through the HBA 2 and the CHA 1 to reach the LU 3 is set as an active path (1911), and its path ID is "213".

Accordingly, active information 403 and the number 408 of active-path-set LU's corresponding to the path ID "213" are respectively updated to "Yes" and "1". A path ID 504 of a new active path corresponding to the LU 3 is updated to "213". The number 604 of active-path-set LU's corresponding to the HBA 2 is updated to "2". An allocated load 603 "1200" corresponding to the HBA 2 is updated to a value "2000" obtained by adding the measured load 502 "800" of the LU 3. The number 704 of own host active-path-set LU's corresponding to the CHA 1 is updated to "2". An allocated load 703 "1900" corresponding to the CHA 1 is updated to a value "2700" obtained by adding the measured load 502 "800" of the LU 3 (1911).

For the LU 4, among the CHA's 1 to 3, especially of the CHA's 2 and 3 whose allocated load 703 is minimum, i.e., "2200", the CHA 3 whose number 704 of own host active-path-set LU's is minimum, i.e., "0" is selected (1604, 1606, 1607, and 1612). On the other hand, since the allocated load 603 alone of the HBA 1 is minimum, i.e., "1500" (1702), the HBA 1 is selected (1703).

As a result, the path passing through the HBA 1 and the CHA 3 to reach the LU 4 is set as an active path (1911), and its path ID is "134".

Accordingly, active information 403 and the number 408 of active-path-set LU's corresponding to the path ID "134" are respectively updated to "Yes" and "1". A path ID 504 of a new active path corresponding to the LU 4 is updated to "134". The number 604 of active-path-set LU's corresponding to the HBA 1 is updated to "2". An allocated load 603 "1500" corresponding to the HBA 1 is updated to a value "2000" obtained by adding the measured load 502 "500" of the LU 4. The number 704 of own host active-path-set LU's corresponding to the CHA 3 is updated to "1". An allocated load 703 "2200" corresponding to the CHA 3 is updated to a value "2700" obtained by adding the measured load 502 "500" of the LU 4 (1911).

The active paths have been set for all the LU's 109 (1905). Thus, a value of the path ID 504 of the new active path of the LU table 500 is copied to the path ID 503 of the current active path (1804).

Figure 30:
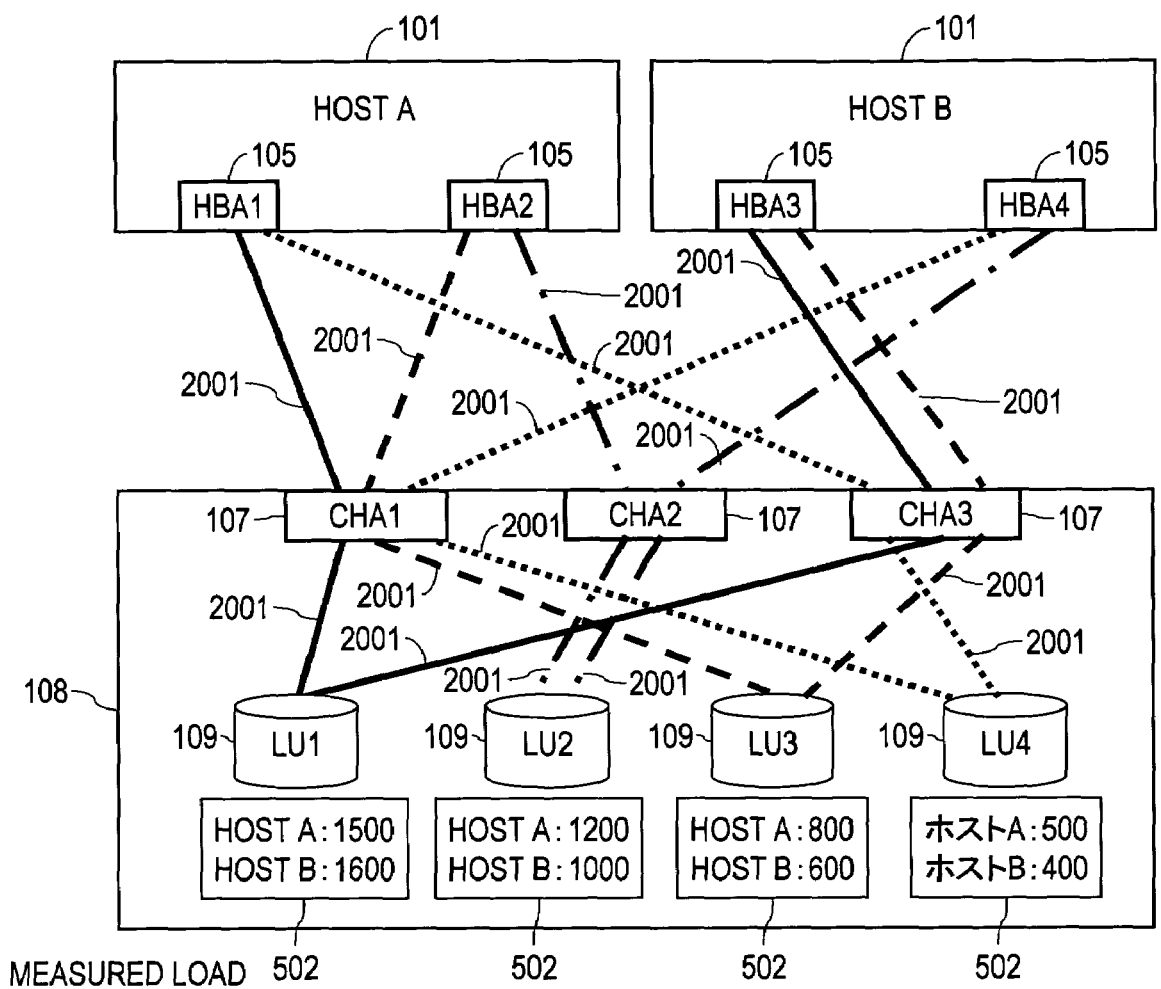
FIG. 30 is an explanatory diagram of a status where an active path of the host A is reset in the computer system of the embodiment of this invention.

The HBA table 600 and the CHA table 700 of the host A at this time are shown in FIGS. 28 and 29. The active path thus set is shown in FIG. 30.

FIG. 28 is an explanatory diagram of the HBA table 600 of the host A in which an active path is reset according to the embodiment of this invention.

The HBA 1 is set as an active path 2001 to the LU's 1 and 4. Thus, the number 604 of active-path-set LU's of the HBA 1 is "2". An allocated load 603 of the HBA 1 is "2000" which is a total value of the measured loads 502 "1500" and "500".

The HBA 2 is set as an active path 2001 to the LU's 2 and 3. Thus, the number 604 of active-path-set LU's of the HBA 2 is "2". An allocated load 603 of the HBA 2 is "2000" which is a total value of the measured loads 502 "1200" and "800".

FIG. 29 is an explanatory diagram of the CHA table 700 of the host A in which an active path is reset according to the embodiment of this invention.

The CHA 1 is set as an active path 2001 to the LU's 1 and 3 by the host A. Thus, the number 704 of own host active-path-set LU's of the CHA 1 is "2". An allocated load 703 of the CHA 1 is "2700" which is a total value of another host load 804 "400", and the measured loads 502 "1500" and "800".

The CHA 2 is set as an active path 2001 to the LU 2 by the host A. Thus, the number 704 of own host active-path-set LU's of the CHA 2 is "1". An allocated load 703 of the CHA 2 is "2200" which is a total value of another host load 804 "1000" and the measured load 502 "1200".

The CHA 3 is set as an active path 2001 to the LU 4 by the host A. Thus, the number 704 of own host active-path-set LU's of the CHA 3 is "1". An allocated load 703 of the CHA 1 is "2700" which is a total value of another host load 804 "2200" and the measured load 502 "500".

FIG. 30 is an explanatory diagram of a status where an active path of the host A is reset in the computer system according to the embodiment of this invention.

As described above; the active path 2001 reaching the LU 1 from the host A passes through the HBA 1 and the CHA 1. The active path 2001 reaching the LU 2 from the host A passes through the HBA 2 and the CHA 2. The active path 2001 reaching the LU 3 from the host A passes through the HBA 2 and the CHA 1. The active path 2001 reaching the LU 4 from the host A passing through the HBA 1 and the CHA 3.

Thus, the execution of the active path resetting subprogram B 208 of the host A is completed (1806). Thereafter, the set active path is operated.

According to this embodiment, when an active path is reset, reference is made to another host load 804 obtained by subtracting the own host measured load 803 from the storage measured load 802 (step 1413 of FIG. 14 and step 1914 of FIG. 19). Then, active paths are set to uniformly balance loads imposed by access from all the hosts 101 (steps 1604 and 1605 of FIG. 16).

FIG. 31 is an explanatory diagram of effects of the active path resetting processing according to the embodiment of this invention.

Referring to FIG. 31, specifically, in the active path resetting subprogram B 206, an active path set when reference is made to another host load 804 (this embodiment) is compared with an active path set when no reference is made.

In FIG. 31, a path ID 3101 of the reset active path indicates a path ID of a reset active path of the host A.

A line 3102 indicates a path ID 3101 of an active path set without reference to another host load 804 (i.e., set without executing the step 1914 of FIG. 19). Detailed description will be omitted, but it should be noted in this case that path ID's of active paths of the host A set for the LU's 1 to 4 are respectively "111", "222", "233", and "134".

On the other hand, a line 3103 indicates a path ID 3101 of an active path set by referring to another host load 804 (i.e., set by executing the step 1914 of FIG. 19). A line 3103 corresponds to this embodiment. According to this embodiment, as shown in FIG. 30, path ID's of active paths of the host A set for the LU's 1 to 4 are respectively "111", "222", "213", and "134".

Comparison of the lines 3102 and 3103 shows a difference only in active paths to the LU 3. As a result, when reference is not made to another host load 804 (line 3102), the CHA 3 is set as an active path to the LU's 3 and 4. On the other hand, when reference is made to another host load 804 (line 3103), the CHA 3 is set only as an active path to the LU 4.

As shown in FIGS. 8 and 27, two active paths are set in the CHA 3 by the host B, resulting in centralized loads. According to this embodiment, the host A sets an active path while avoiding the CHA 3 in which loads are centralized. As a result, the load is balanced in the entire system.

Next, description will be made of the processing of the active path resetting subprogram A 207 (FIG. 14) in the case where an active path stops after initial active paths are set in the host A and the host B.

Here, an example where a path whose path ID is "133" among the active paths 2001 shown in FIG. 27 stops will be described. The active path 2001 whose path ID is "133" is connected to the host A. Accordingly, when this active path 2001 stops, the active path resetting subprogram A 207 of the host A is executed. The path table 400, the HBA table 600, the CHA table 700, and the load information table 800 when the path stops are as respectively shown in FIGS. 4, 6, 7, and 8.

In this example, since the active path stops (1402), active path resetting processing of FIG. 15 at the active path stop time is executed (1403).

First, "1" is subtracted from the number of active-path-set LU's of each table (1502). Specifically, the number 408 of active-path-set LU's corresponding to the path ID "133" (path number 401 is "15") of the path table 400 of FIG. 4 of the host A becomes "0". The number 604 of active-path-set LU's corresponding to the HBA 1 of the HBA table 600 of the host A becomes "1". The number 704 of own host active set LU's corresponding to the CHA 3 of the CHA table 700 of the host A becomes "0".

Next, the allocated load 603 of the HBA table 600 and the allocated load 703 of the CHA table 700 become "0" (1503 and 1504).

Next, in the HBA table 600, "1500" obtained by subtracting a value "800" of the measured load 407 of the stopped active path 2001 from a value "2300" of the measured load 602 of the HBA 1 is set as an initial value of the allocated load 603 (1505). For the HBA 2, a value "1700" of the measured load 602 is set as an initial value of the allocated load 603 (1505). The HBA table 600 at this time is shown in FIG. 32.

The stopped active path 2001 passes through the CHA 3. In this example, there are no other paths under operation passing through the CHA 3 (1508) (e.g., failure occurs in the CHA 3 itself). At this time, in the CHA table 700, "2200" obtained by subtracting a value "800" of the measured load 407 of the stopped active path 2001 from a value "3000" of the storage measured load 802 of the CHA 3 is set as an initial value of the allocated load 703 (1509). For the CHA's 1 and 2, values "2400" and "2200" of the storage measured loads 802 are set as initial values of allocated loads 703 (1509). The CHA table 700 at this time is shown in FIG. 33.

Next, CHA selection processing (1510) and HBA selection processing (1511) are executed, and a path passing through the selected HBA 105 and CHA 107 is set as a new active path 2001 to the LU 3 (1512).

When a failure occurs in the CHA 3 itself, the active paths whose path ID's "331" and "333" also stop. Accordingly, the host B executes processing similar to the above for the active paths 2001.

Thus, when the active path 2001 stops, reference is made to a load imposed by the other host, and a new path is reset to balance the loads on the entire system.

According to the embodiment described above, each host 101 includes the alternate path management program 203. However, when a plurality of hosts 101 are connected to the storage system 108, if the storage system includes a storage load measuring program 301, and at least one host 101 includes an alternate path management program 203, the host 101 can realize load dispersion of this invention by setting an active path.

For example, in FIG. 1, if the host B alone includes an alternate path management program 203, since the host A does not include an alternate path management program 203, no active path is set, and load dispersion of this invention is not realized. On the other hand, the host B can calculate a load on each CHA 107 imposed by the host A by referring to the storage measured load 802 measured by the storage load measuring program 301. As a result, the host B can set an active path (initial setting and resetting) to balance the load on the entire system.

Thus, according to this invention, an active path is set for each LU 109, and the host 101 accesses the LU 109 through the active path. The active path is set to balance an access load from the host 101. When a plurality of hosts 101 are connected to the storage system 108, by referring to a load imposed by the other host, an active path is set to balance the access load on the entire system. As a result, it is possible to prevent reduction in performance caused by centralized access.

In a period until next resetting from when the active path is set (or reset), the host 101 accesses one LU 109 through the same path. In other words, as the active path is not changed for each access, a cache memory such as the CHA 107 included in the active path is effectively used. Especially, previously read data stored in the cache memory is effectively used during sequential access. As a result, it is possible to improve performance.

When an uneven access load occurs, an active path is reset to eliminate the uneven load. In this case, similarly to the foregoing, an active path is reset to balance the access load on the entire system by referring to the load imposed by the other host. Thus, it is possible to always maintain good performance.

Furthermore, when the active path is reset, the resetting is carried out in order from the LU 109 of the large load. Thus, it is possible to properly balance the load.

What is claimed is:

1. A computer system, comprising:
   a plurality of hosts; and
   a storage system coupled to the plurality of hosts, wherein the storage system includes a plurality of channel adaptors that couple with the plurality of hosts, a plurality of logical units that store data, and a storage load measuring module that measures a storage measured load for each channel adaptor,
   wherein each of the hosts includes one or more host bus adaptors that couple with the storage system,
   wherein at least one of the plurality of hosts includes an alternate path management module that manages paths through which the plurality of hosts access the logical units,
   wherein the alternate path management module includes:
      a host load measuring module that measures, for each logical unit and each channel adaptor, a host measured load caused by access from the at least one host to the logical unit; and
      an active path setting module that selects one of the channel adaptors for each logical unit based on the storage measured load measured by the storage load measuring module and the host measured load measured by the host load measuring module, and sets an active path passing through the channel adaptor, and
   wherein the active path setting module:
      calculates, for each channel adaptor, a host load caused by a host, other than the at least one host that includes the active path setting module, by subtracting the host measured load regarding the channel adaptor from the storage measured load;
      calculates, for each channel adaptor, a total value of the host load and the host measured load regarding the active path allocated to the channel adaptor;
      selects the channel adaptor having a smallest total value of the host measured load and the host load, and having a smallest calculated number of active paths;
      when there are a plurality of channel adaptors having the smallest total value of the host measured load and the host load, calculates the number of set active paths for each channel adaptor and selects the channel adaptor having the smallest total value of the host measured load and the host load and having the smallest calculated number of active paths;
      compares the host measured loads measured for the logical units with one another; and
      sets the active path of the logical unit of a largest host measured load before setting the active path of the logical unit of a smallest host measured load.

2. A computer system, comprising:
   a plurality of computers; and
   a storage system coupled to the plurality of computers, wherein the storage system includes a plurality of channel adaptors that couple with the plurality of computers, a plurality of logical units that store data, and a first load measuring module that measures a first access load for each channel adaptor,
   wherein each of the computers includes one or more host bus adaptors that couple with the storage system,
   wherein at least one of the computers includes a path management module that manages paths through which the computers access the logical units; and
   wherein the path management module includes:
      a second load measuring module that measures, for each logical unit and each channel adaptor, a second access load caused by access from the at least one of the computers to the logical unit; and
      an active path setting module that selects one of the channel adaptors for each logical unit based on the first access load measured by the first load measuring module and the second access load measured by the second load measuring module, and sets an active path passing through the channel adaptor,
   wherein the active path setting module:
      calculates, for each channel adaptor, a third access load caused by at least one computer other than the computer including the active path setting module by subtracting the second access load regarding the channel adaptor from the first access load;
      calculates, for each channel adaptor, a total value of the third access load and the second access load regarding the active path allocated to the channel adaptor; and
      selects the channel adaptor having a smallest total value of the second access load and the third access load.

3. The computer system according to claim 2, wherein when there are a plurality of channel adaptors having the smallest total value of the second access load and the third access load, and having a smallest calculated number of active paths, the active path setting module further:
   calculates the number of active paths set for each channel adaptor; and
   selects the channel adaptor having the smallest total value of the second access load and the third access load and having the smallest calculated number of active paths.

4. The computer system according to claim 2, wherein the active path setting module:
   compares the second access loads measured for the logical units with one another; and
   sets the active path of the logical unit of the second access load measured to be largest before setting the active path of the logical unit of the second access load measured to be smallest.

5. A program tangibly embodied on a computer readable storage medium, wherein the program is executed in at least one of a plurality of computers coupled to a storage system, the storage system including a plurality of channel adaptors that couple with the plurality of computers, and a plurality of logical units that store data, the plurality of computers including one or more host bus adaptors that couple with the storage system, wherein the program causes at least one of the computers to:

obtain a first access load measured for each channel adaptor;

measure a second access load for each logical unit and each channel adaptor;

select one of the channel adaptors for each logical unit based on the first access load and the second access load;

set an active path passing through the channel adaptor;

calculate, for each channel adaptor, a third access load caused by a computer, other than the at least one of the computers that sets the active path, by subtracting the second access load regarding the logical unit from each first access load separately;

calculate, for each channel adaptor, a total value of the third access load and the second access load regarding the active path allocated to the channel adaptor;

when there is only one channel adaptor having a smallest total value of the second access load and the third access load, and having a smallest calculated number of active paths, selects the channel adaptor having the smallest total value of the second access load and the third access load; and when there are a plurality of channel adaptors having the smallest total value of the second access load and the third access load, calculate the number of active paths set for each channel adaptor and select the channel adaptor having the smallest total value of the second access load and the third access load and having the smallest calculated number of active paths.

6. A method of setting an active path through which at least one of a plurality of computers accesses a plurality of logical units in a computer system that includes the plurality of computers and a storage system coupled to the computers, the storage system including a plurality of channel adaptors that couple with the plurality of computers, and the plurality of logical units that store data, each of the computers including one or more host bus adaptors that couple with the storage system, the method comprising:

obtaining a first access load measured for each channel adaptor;

measuring a second access load for each logical unit and each channel adaptor;

selecting one of the channel adaptors for each logical unit based on the first access load and the second access load; and setting an active path passing through the channel adaptor, wherein setting of the active path includes:

calculating, for each channel adaptor, a third access load caused by a computer, other than the at least one of the plurality of computers that sets the active path, by subtracting the second access load regarding the logical unit from each first access load separately;

calculating, for each channel adaptor, a total value of the third access load and the second access load regarding the active path allocated to the channel adaptor;

when there is only one channel adaptor having a smallest total value of the second access load and the third access load, selecting the channel adaptor having the smallest total value of the second access load and the third access load, and having a smallest calculated number of active paths; and when there are a plurality of channel adaptors having the smallest total value of the second access load and the third access load, calculating the number of active paths set for each channel adaptor, and selecting the channel adaptor having the smallest total of the second access load and the third access load and having the smallest calculated number of active paths.

\* \* \* \* \*